US012038224B2

(12) United States Patent
Xia et al.

(10) Patent No.: US 12,038,224 B2
(45) Date of Patent: Jul. 16, 2024

(54) HINGE ASSEMBLY WITH MOVABLE PLATE AND REFRIGERATOR HAVING THE SAME

(71) Applicants: QINGDAO HAIER REFRIGERATOR CO., LTD., Qingdao (CN); HAIER SMART HOME CO., LTD., Qingdao (CN)

(72) Inventors: Enpin Xia, Qingdao (CN); Jiaming Li, Qingdao (CN); Hao Zhang, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 294 days.

(21) Appl. No.: 17/629,761

(22) PCT Filed: Jan. 15, 2020

(86) PCT No.: PCT/CN2020/072262

§ 371 (c)(1),
(2) Date: Jan. 24, 2022

(87) PCT Pub. No.: WO2021/012657

PCT Pub. Date: Jan. 28, 2021

(65) Prior Publication Data

US 2022/0252329 A1 Aug. 11, 2022

(30) Foreign Application Priority Data

Jul. 23, 2019 (CN) ......................... 201910665940.5
Jul. 23, 2019 (CN) ......................... 201910666689.4

(Continued)

(51) Int. Cl.
*F25D 23/00* (2006.01)
*E05D 3/18* (2006.01)

(Continued)

(52) U.S. Cl.
CPC ............ *F25D 23/028* (2013.01); *E05D 3/18* (2013.01); *E05D 7/081* (2013.01); *E05Y 2900/31* (2013.01)

(58) Field of Classification Search
CPC ... F25D 23/028; F25D 2323/024; E05D 3/18; E05D 7/081; E05D 11/0054; E05Y 2900/31

(Continued)

(56) References Cited

U.S. PATENT DOCUMENTS 2,206,499 A * 7/1940 Dumelin .................. E05D 1/04 16/358
2,815,252 A * 12/1957 Baker ....................... C09J 7/20 312/334.36

(Continued)

FOREIGN PATENT DOCUMENTS

CN 1432781 A 7/2003
CN 203274419 U 11/2013

(Continued)

OTHER PUBLICATIONS

CN-103850554 English translation 2020 (Year: 2020).*

*Primary Examiner* — Janet M Wilkens
(74) *Attorney, Agent, or Firm* — Cheng-Ju Chiang

(57) ABSTRACT

A hinge assembly with a movable plate and a refrigerator having the same are provided. The hinge assembly includes a first hinge part, a second hinge part, and the movable plate, wherein the first hinge part, the second hinge part, and the movable plate are fitted with one another, the first hinge part is provided with a driving groove, the second hinge part is provided with a driving shaft fitted with the driving groove, and the movable plate is detachably provided in the driving groove. Dust, impurities, or the like, may be brought out by detaching the movable plate from the driving groove.

18 Claims, 17 Drawing Sheets

(30) Foreign Application Priority Data

Jul. 23, 2019 (CN) ......................... 201910666717.2
Jul. 23, 2019 (CN) ......................... 201910667529.1

(51) Int. Cl.
*E05D 7/081* (2006.01)
*F25D 23/02* (2006.01)

(58) Field of Classification Search
USPC ........... 312/236, 405; 16/341, 361, 364, 358
See application file for complete search history.

(56) References Cited

U.S. PATENT DOCUMENTS

| | | | | | |
|---|---|---|---|---|---|
| 2,867,839 | A | * | 1/1959 | Squire | E05D 3/18 16/358 |
| 4,609,234 | A | * | 9/1986 | Naniwa | E05D 3/022 16/361 |
| 6,493,906 | B2 | | 12/2002 | Matteau | |
| 10,876,333 | B2 | * | 12/2020 | Zhang | F25D 23/028 |
| 2020/0124342 | A1 | * | 4/2020 | Zhang | E05D 11/1028 |

FOREIGN PATENT DOCUMENTS

| | | | | | |
|---|---|---|---|---|---|
| CN | 103850554 | B | * | 7/2017 | E05D 11/0054 |
| CN | 109470008 | A | | 3/2019 | |
| CN | 111749565 | A | * | 10/2020 | E05D 11/00 |
| JP | H9-33162 | A | | 2/1997 | |
| KR | 10-1773293 | B1 | | 9/2017 | |

* cited by examiner

HINGE ASSEMBLY WITH MOVABLE PLATE AND REFRIGERATOR HAVING THE SAME

The present application is a 35 U.S.C. § 371 National Phase conversion of International (PCT) Patent Application No. PCT/CN2020/072262, filed on Jan. 15, 2020, which claims priority to Chinese Patent Application No. 201910665940.5, entitled "Hinge Assembly with Movable Plate and Refrigerator Having The Same", filed on Jul. 23, 2019, Chinese Patent Application No. 201910666689.4, entitled "Refrigerator with Movable Plate", filed on Jul. 23, 2019, Chinese Patent Application No. 201910667529.1, entitled "Hinge Assembly with Movable Plate and Refrigerator Having The Same", filed on Jul. 23, 2019, and Chinese Patent Application No. 201910666717.2, entitled "Refrigerator with Movable Plate", filed on Jul. 23, 2019, the disclosures of which are incorporated herein by reference in their entirety. The PCT International Patent Application was filed and published in Chinese.

TECHNICAL FIELD

The present invention relates to the field of household appliance technologies, and in particular, to a hinge assembly with a movable plate and a refrigerator having the same.

BACKGROUND

Generally, a refrigerator is opened and closed by a hinge assembly, the hinge assembly includes a driving shaft and a driving groove which are fitted with each other, the driving groove is provided with an opening, and external dust, impurities, or the like, tend to enter the driving groove through the opening and are difficult to remove.

SUMMARY

An object of the present invention is to provide a hinge assembly with a movable plate and a refrigerator having the same, which may facilitate an operation of bringing dust, impurities, or the like, out of the hinge assembly.

In order to achieve one of the above objects of the present invention, an embodiment of the present invention provides a hinge assembly with a movable plate, comprising a first hinge part, a second hinge part, and the movable plate, wherein the first hinge part, the second hinge part, and the movable plate are fitted with one another, the first hinge part is provided with a driving groove, the second hinge part is provided with a driving shaft fitted with the driving groove, and the movable plate is detachably provided in the driving groove.

As a further improvement of an embodiment of the present invention, the driving groove comprises a bottom wall and a side wall provided around the bottom wall, and the movable plate is provided adjacent to the bottom wall.

As a further improvement of an embodiment of the present invention, the bottom wall comprises a first region and a second region, the first region is overlapped with the movable plate, and the second region is separated from the movable plate; when moving in the first region, the driving shaft restricts separation of the movable plate from the driving groove, and when moving to the second region, the driving shaft is separated from the movable plate.

As a further improvement of an embodiment of the present invention, the movable plate comprises a first side portion and a second side portion connected with each other, the first side portion is movably connected with the side wall, and the second side portion is provided around the first region.

As a further improvement of an embodiment of the present invention, the first side portion has a first clamping portion, the side wall has a second clamping portion, and the first clamping portion and the second clamping portion are fitted with each other.

As a further improvement of an embodiment of the present invention, the movable plate comprises a movable plate body, the first clamping portions are configured as a plurality of protrusions protruding from the movable plate body, the protrusion is parallel to the movable plate body, the second clamping portions are configured as a plurality of recesses located at the side wall near the bottom wall, and the plurality of protrusions and the plurality of recesses are fitted with each other.

As a further improvement of an embodiment of the present invention, the movable plate is provided with a poking hole, and the poking hole drives the movable plate to be separated from the driving groove when a force is applied to the poking hole.

As a further improvement of an embodiment of the present invention, the driving groove comprises a bottom wall and a side wall provided around the bottom wall, the movable plate comprises a movable plate body and a plurality of protruding portions protruding from the movable plate body, the protruding portion is perpendicular to the movable plate body, the movable plate body and the bottom wall are fitted with each other, and the protruding portion and the side wall are fitted with each other.

As a further improvement of an embodiment of the present invention, the side wall is provided with a plurality of groove portions fitted with the plurality of protruding portions, an extending direction of the groove portion is parallel to an opening direction of the bottom wall towards the driving groove, a protruding point is provided in the groove portion, and the protruding portion is provided with a hole fitted with the protruding point.

As a further improvement of an embodiment of the present invention, a slope is provided on a side of the protruding portion apart from the movable plate body, and when the protruding portion is limited in the groove portion, a gap is formed between the slope and the groove portion.

In order to achieve one of the above objects of the present invention, an embodiment of the present invention provides a refrigerator, comprising the hinge assembly with a movable plate according to any one of the above technical solutions.

As a further improvement of an embodiment of the present invention, the refrigerator comprises a cabinet, a door for opening and closing the cabinet, and the hinge assembly for connecting the cabinet and the door, wherein the cabinet comprises an accommodating chamber and a pivoting side connected with the hinge assembly; when the door is opened, the driving shaft moves in the driving groove to drive the door to move from the pivoting side to the accommodating chamber.

As a further improvement of an embodiment of the present invention, the hinge assembly further comprises a positioning shaft and a positioning groove fitted with each other, the positioning shaft is provided on one of the first hinge part and the second hinge part, and the positioning groove is provided in the other of the first hinge part and the second hinge part.

As a further improvement of an embodiment of the present invention, the positioning groove is provided in the first hinge part, and the positioning shaft is provided on the second hinge part.

As a further improvement of an embodiment of the present invention, the positioning groove comprises an initial position and a first stop position, and the driving groove comprises a first end and a second end opposite to each other; when the door is in the closed state, the positioning shaft is located at the initial position, and the driving shaft is located at the first end, and when the door is opened, the driving shaft moves in the driving groove to drive the positioning shaft to move from the initial position to the first stop position.

As a further improvement of an embodiment of the present invention, the driving groove comprises a first section and a second section connected between the first end and the second end; when the door is opened from the closed state to a first opening angle, the positioning shaft is kept at the initial position, and the driving shaft moves in the first section around the positioning shaft, and when the door is continuously opened from the first opening angle to a second opening angle, the driving shaft moves in the second section to drive the positioning shaft to move from the initial position to the first stop position.

As a further improvement of an embodiment of the present invention, the door is provided with a first fitting portion, the cabinet is provided with a second fitting portion, the first fitting portion and the second fitting portion are engaged with each other when the door is in the closed state, and when the door is opened from the closed state to the first opening angle, the driving shaft moves in the first section around the positioning shaft to drive the first fitting portion to be disengaged from the second fitting portion.

As a further improvement of an embodiment of the present invention, the positioning groove further comprises a second stop position located on a side of the initial position apart from the first stop position, and the driving groove further comprises a third section and a fourth section located between the second section and the second end; when the door is continuously opened from the second opening angle to a third opening angle, the driving shaft moves in the third section to drive the positioning shaft to move from the first stop position to the second stop position, and when the door is continuously opened from the third opening angle to a maximum opening angle, the positioning shaft is kept at the second stop position, the driving shaft moves in the fourth section around the positioning shaft, and when moving to the second end, the driving shaft is separated from the movable plate.

As a further improvement of an embodiment of the present invention, the movable plate covers the first section, the second section, the third section and a part of the fourth section of the driving groove.

As a further improvement of an embodiment of the present invention, the door comprises a first door and a second door, the first door and the second door are pivotally connected with the cabinet and arranged side by side in a horizontal direction, the refrigerator further comprises a vertical beam movably connected to a side of the first door close to the second door, the first fitting portion is provided at the vertical beam, and when the door is in the closed state, the vertical beam extends to the second door; when the door is opened from the closed state to the first opening angle, the vertical beam rotates towards a side close to the accommodating chamber, such that a first folding angle is formed between the first door and the vertical beam, and when the door is continuously opened from the first opening angle to the second opening angle, the vertical beam and the first door are kept relatively static.

Compared with a prior art, the present invention has the following beneficial effects: in an embodiment of the present invention, the dust, the impurities, or the like, may be brought out by detaching the movable plate from a driving groove.

DETAILED DESCRIPTION

Figure 1:
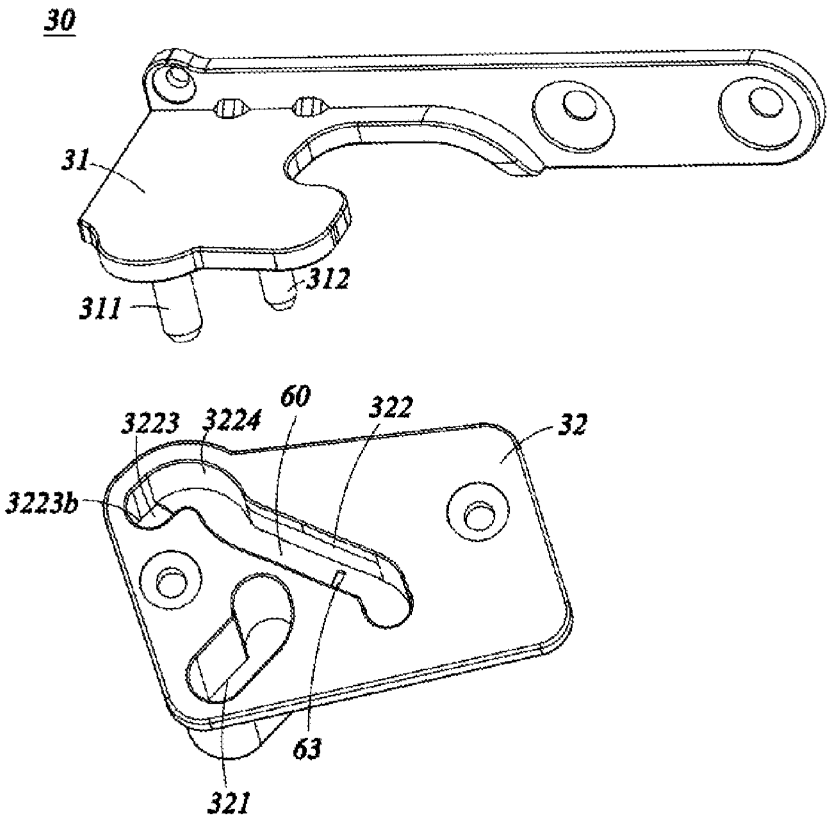
FIG. 1 is a perspective view of a hinge assembly according to a first embodiment of the present invention.

Hereinafter, the present invention will be described in detail in conjunction with specific embodiments shown in the accompanying drawings. However, these embodiments have no limitations on the present invention, and any transformations of structure, method, or function made by persons skilled in the art according to these embodiments fall within the protection scope of the present invention.

In drawings of the invention, some of the dimensions of the structure or portion may be enlarged relative to those of other structures or portions for ease of illustration and thus are merely used to illustrate the basic structure of the subject matter of the present invention.

In addition, the terms expressive of spatial relative positions, such as "upper", "above", "lower", "below", "left", "right", or the like herein are used to describe the relationship of a unit or feature relative to another unit or feature in the drawings, for the purpose of illustration and description. Terms expressive of the spatial relative positions are intended to include different orientations of the device in use or operation other than the orientations shown in the drawings. For example, if the device in the drawings is turned over, the units which are described to be located "below" or "under" other units or features are "above" other units or features. Therefore, the exemplary term "below" may include both the "above" and "below" orientations. The device may be oriented (rotated by 90 degrees or other orientations) in other ways, correspondingly explaining the expressions related to the space herein.

Figure 2:
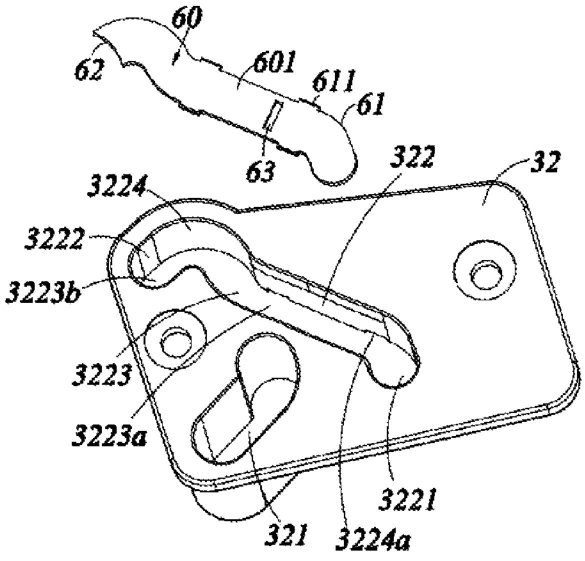
FIG. 2 is an exploded view of the hinge assembly according to the first embodiment of the present invention.

FIGS. 1 and 2 are schematic diagrams of a hinge assembly 30 with a movable plate 60 according to a first embodiment of the present invention.

The hinge assembly 30 includes a first hinge part 32, a second hinge part 31, and the movable plate 60, which are fitted with one another.

The first hinge part 32 is provided with a driving groove 322, the second hinge part 31 is provided with a driving shaft 312, and the movable plate 60 is detachably provided in the driving groove 322.

Here, when entering the driving groove 322, dust, impurities, or the like, may be brought out by detaching the movable plate 60 from the driving groove 322.

In the present embodiment, the driving groove 322 includes a bottom wall 3223 and a side wall 3224 provided around the bottom wall 3223, and the movable plate 60 is provided adjacent to the bottom wall 3223.

Here, the bottom wall 3223 of the driving groove 322 is configured as a sealed bottom wall, and the movable plate 60 is provided against the bottom wall 3223.

The bottom wall 3223 includes a first region 3223*a* and a second region 3223*b*, the first region 3223*a* is overlapped with the movable plate 60, and the second region 3223*b* is separated from the movable plate 60.

That is, the movable plate 60 has a size less than a size of the bottom wall 3223, and is matched with the first region 3223*a*, and when provided in the driving groove 322, the movable plate 60 covers the first region 3223*a*, and exposes the second region 3223*b*, and a size of the second region 3223*b* is matched with a size of the driving shaft 312.

When moving in the first region 3223*a*, the driving shaft 312 restricts separation of the movable plate 60 from the driving groove 322, and when moving to the second region 3223*b*, the driving shaft 312 is separated from the movable plate 60, and at this point, the movable plate 60 may be taken out from the driving groove 322.

It may be observed that the movable plate 60 may be taken out only by moving the driving shaft 312 to the second region 3223*b*, and the hinge assembly 30 is not required to be disassembled, thus achieving convenient and fast effects.

In the present embodiment, the driving groove 322 includes a first end 3221 and a second end 3222 opposite to each other, and the first region 3223*a* is provided adjacent to the second end 3222.

Certainly, in other embodiments, the first region 3223*a* and the second region 3223*b* may have other forms; for example, the movable plate 60 is divided into two sections, and the two sections are adjacent to the first end 3221 and the second end 3222 respectively.

In the present embodiment, the movable plate 60 includes a first side portion 61 and a second side portion 62 connected with each other, and the first side portion 61 and the second side portion 62 are configured as peripheral regions of the movable plate 60.

The first side portion 61 is movably connected with the side wall 3224, and the second side portion 62 is provided around the first region 3223*a*.

That is, the first side portion 61 is configured as the peripheral region adjacent to the side wall 3224, the second side portion 62 is located between the first region 3223*a* and the second region 3223*b*, and a contour of the second side portion 62 is matched with an outer contour of the driving shaft 312.

The first side portion 61 has a first clamping portion 611, the side wall 3224 has a second clamping portion 3224*a*, and the first clamping portion 611 and the second clamping portion 3224*a* are fitted with each other.

Specifically, the movable plate 60 includes a movable plate body 601, the first clamping portions 611 are configured as a plurality of protrusions 611 protruding from the movable plate body 601, the protrusion 611 is parallel to the movable plate body 601, the second clamping portions 3224*a* are configured as a plurality of recesses 3224*a* located at the side wall 3224 near the bottom wall 3223, and the plurality of protrusions 611 and the plurality of recesses 3224*a* are fitted with each other.

Here, a periphery of the movable plate body 601 is matched with the side wall 3224, and the protrusion 611 protrudes from the movable plate body 601 towards the side wall 3224, the protrusion 611 has elasticity, or the entire movable plate 60 has elasticity, and the protrusion 611 and the recess 3224*a* may be engaged with and disengaged from each other by elastic deformation.

In addition, the periphery of the movable plate body 601 is provided with a plurality of protrusions 611 (here, four, for example), and the four protrusions 611 are symmetrically arranged.

In the present embodiment, the movable plate 60 is provided with a poking hole 63, and the poking hole 63 drives the movable plate 60 to be separated from the driving groove 322 when a force is applied to the poking hole 63.

That is, when the driving shaft 312 moves to the second region 3223*b*, the movable plate 60 may be driven to be separated from the driving groove 322 by other components acting on the poking hole 63.

Figure 3:
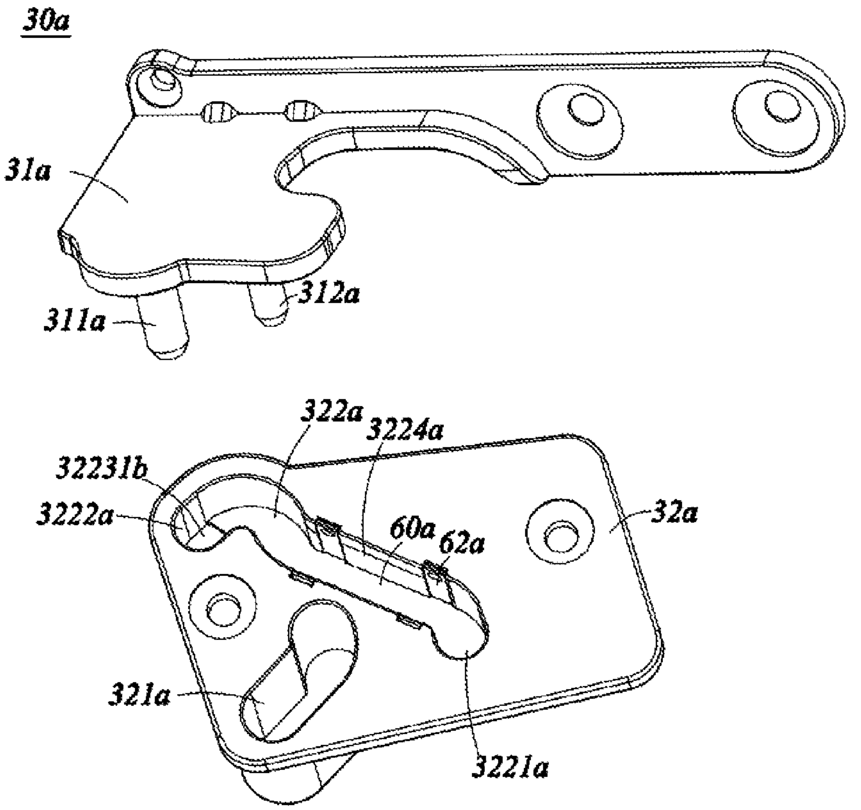
FIG. 3 is a perspective view of a hinge assembly according to a second embodiment of the present invention.
Figure 4:
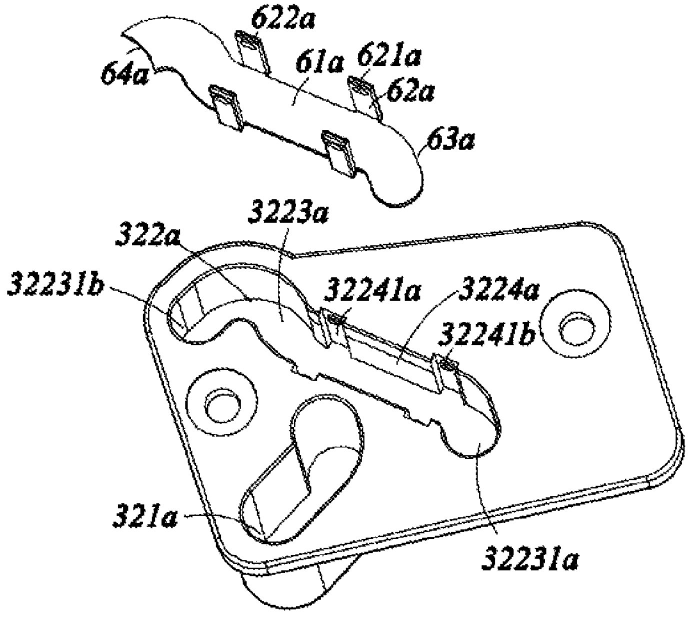
FIG. 4 is an exploded view of the hinge assembly according to the second embodiment of the present invention.
Figure 5:
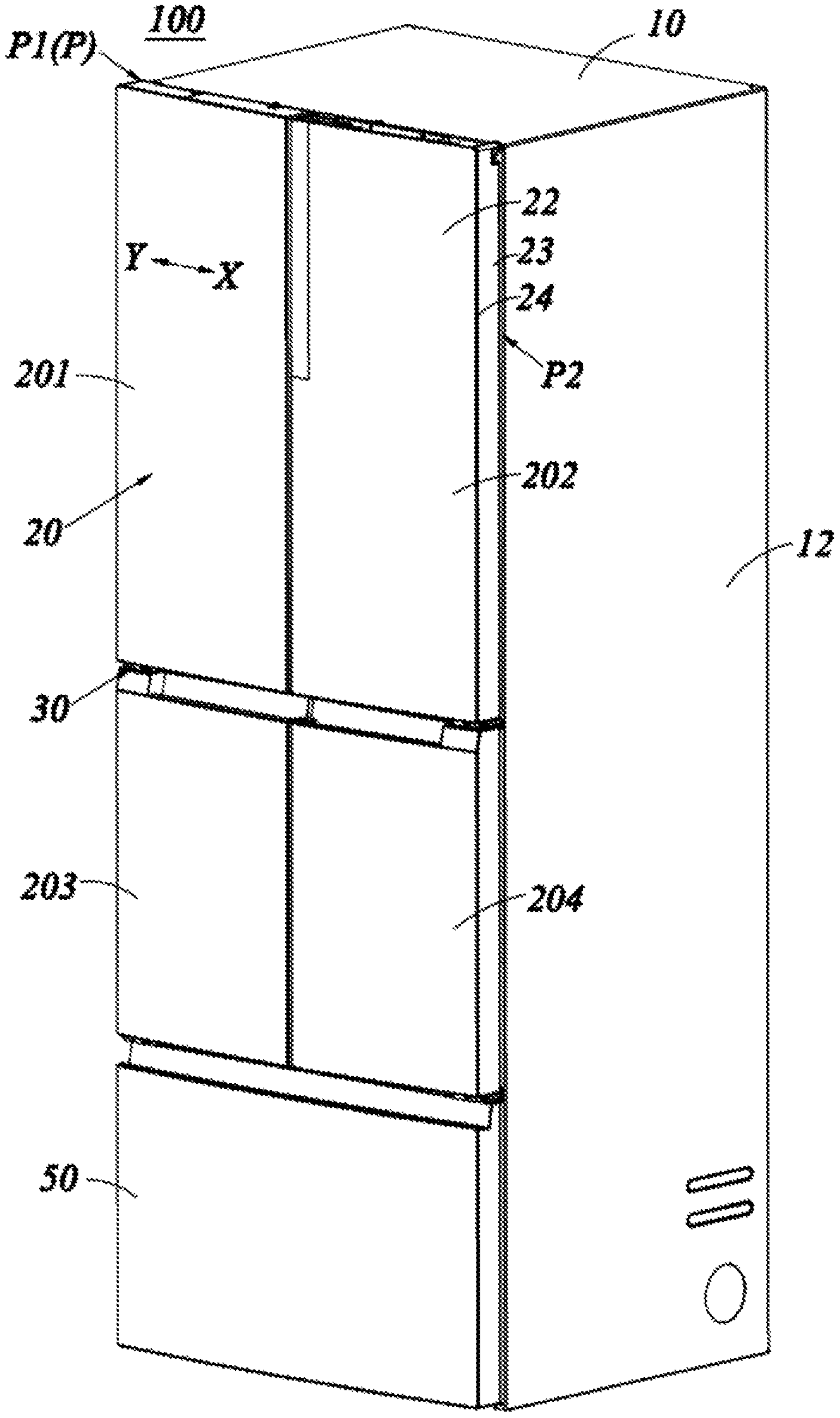
FIG. 5 is a perspective view of a refrigerator according to an embodiment of the present invention.

FIGS. 3 and 4 are schematic diagrams of a hinge assembly 30*a* with a movable plate 60*a* according to a second embodiment of the present invention.

The hinge assembly 30*a* includes a first hinge part 32*a*, a second hinge part 31*a*, and the movable plate 60*a*, which are fitted with one another.

The first hinge part 32*a* is provided with a driving groove 322*a*, the second hinge part 31*a* is provided with a driving shaft 312*a*, and the movable plate 60*a* is detachably provided in the driving groove 322*a*.

Here, when entering the driving groove 322*a*, dust, impurities, or the like, may be brought out by detaching the movable plate 60*a* from the driving groove 322*a*.

In the present embodiment, the driving groove 322*a* includes a bottom wall 3223*a* and a side wall 3224*a* provided around the bottom wall 3223*a*, the movable plate 60*a* includes a movable plate body 61*a* and a plurality of protruding portions 62*a* protruding from the movable plate body 61*a*, the protruding portion 62*a* is perpendicular to the movable plate body 61*a*, the movable plate body 61*a* and the bottom wall 3223*a* are fitted with each other, and the protruding portion 62*a* and the side wall 3224*a* are fitted with each other.

Specifically, the side wall 3224*a* is provided with a plurality of groove portions 32241*a* fitted with the plurality of protruding portions 62*a*, and an extending direction of the groove portion 32241*a* is parallel to an opening direction of the bottom wall 3223*a* towards the driving groove 322*a*.

Here, a periphery of the movable plate body 61*a* is matched with the side wall 3224*a*, while the protruding portion 62*a* protrudes from the movable plate body 61*a* in a direction apart from the bottom wall 3223*a* and a direction close to the side wall 3224*a*, and the groove portion 32241*a* is recessed in the side wall 3224*a*.

A protruding point 32241*b* is provided in the groove portion 32241*a*, the protruding portion 62*a* is provided with a hole 621*a* fitted with the protruding point 32241*b*, and when the protruding portion 62*a* is fitted with the groove portion 32241*a*, the protruding point 32241*b* is limited in the hole 621*a*, thereby improving fitting firmness of the groove portion 32241*a* and the protruding portion 62*a*.

Here, the protruding portion 62*a* has elasticity, or the entire movable plate 60*a* has elasticity, and the hole 621*a* of the protruding portion 62*a* and the protruding point 32241*b* of the groove portion 32241*a* may be engaged with and disengaged from each other by elastic deformation.

In addition, the periphery of the movable plate body 61*a* is provided with a plurality of protruding portions 62*a* (here, four, for example), and the four protruding portions 62*a* are symmetrically arranged.

In the present embodiment, a slope 622*a* is provided on a side of the protruding portion 62*a* apart from the movable plate body 61*a*, and when the protruding portion 62*a* is limited in the groove portion 32241*a*, a gap is formed between the slope 622*a* and the groove portion 32241*a*.

As such, the hole 621*a* may be disengaged from the protruding point 32241*b* by action on the slope 622*a*, so as to drive the movable plate 60*a* to be separated from the driving groove 322*a*.

In the present embodiment, the movable plate body 61*a* is provided adjacent to the bottom wall 3223*a*.

Here, the bottom wall 3223*a* of the driving groove 322*a* is configured as a sealed bottom wall, and the movable plate body 61*a* is provided against the bottom wall 3223*a*.

The bottom wall 3223*a* includes a first region 32231*a* and a second region 32231*b*, the first region 32231*a* is overlapped with the movable plate 60*a*, and the second region 32231*b* is separated from the movable plate 60*a*.

That is, the movable plate 60*a* has a size less than a size of the bottom wall 3223*a*, and is matched with the first region 32231*a*, and when provided in the driving groove 322*a*, the movable plate 60*a* covers the first region 32231*a*, and exposes the second region 32231*b*, and a size of the second region 32231*b* is matched with a size of the driving shaft 312*a*.

When moving in the first region 32231*a*, the driving shaft 312*a* restricts separation of the movable plate 60*a* from the driving groove 322*a*, and when moving to the second region 32231*b*, the driving shaft 312*a* is separated from the movable plate 60*a*, and at this point, the movable plate 60*a* may be taken out from the driving groove 322*a*.

It may be observed that the movable plate 60*a* may be taken out only by moving the driving shaft 312*a* to the second region 32231*b*, and the hinge assembly 30*a* is not required to be disassembled, thus achieving convenient and fast effects.

In the present embodiment, the driving groove 322*a* includes a first end 3221*a* and a second end 3222*a* opposite to each other, and the first region 32231*a* is provided adjacent to the second end 3222*a*.

Certainly, in other embodiments, the first region 32231*a* and the second region 32231*b* may have other forms; for example, the movable plate 60*a* is divided into two sections, and the two sections are adjacent to the first end 3221*a* and the second end 3222*a* respectively.

In the present embodiment, the movable plate 60*a* includes a first side portion 63*a* and a second side portion 64*a* connected with each other, and the first side portion 63*a* and the second side portion 64*a* are configured as peripheral regions of the movable plate 60*a*.

The first side portion 63*a* is movably connected with the side wall 3224*a*, and the second side portion 64*a* is provided around the first region 32231*a*.

That is, the first side portion 63*a* is configured as the peripheral region adjacent to the side wall 3224*a*, the second side portion 64*a* is located between the first region 32231*a* and the second region 32231*b*, and a contour of the second side portion 64*a* is matched with an outer contour of the driving shaft 312*a*.

With reference to FIGS. 5 to 10, an embodiment of the present invention further provides a refrigerator 100 which includes the above-mentioned hinge assembly 30.

The refrigerator 100 includes a cabinet 10, a door 20 for opening and closing the cabinet 10, and a hinge assembly 30 for connecting the cabinet 10 and the door 20.

The cabinet 10 includes an accommodating chamber S and a pivoting side P connected with the hinge assembly 30.

Here, the "pivoting side P" is defined as a region where the door 20 is rotated relative to the cabinet 10, i.e., a region where the hinge assembly 30 is provided, a direction from the pivoting side P to the accommodating chamber S is defined as a first direction X, and a direction from the accommodating chamber S to the pivoting side P is defined as a second direction Y.

Specifically, when the hinge assemblies 30 are provided on both left and right sides of the refrigerator 100, the cabinet 10 includes a left pivoting side P1 and a right pivoting side P2; when the left pivoting side P1 serves as the pivoting side P, the first direction X is from left to right, and the second direction Y is from right to left, and when the right pivoting side P2 serves as the pivoting side P, the first direction X is from right to left, and the second direction Y is from left to right; that is, actual directions of the first direction X and the second direction Y are different corresponding to different pivoting sides P, and for example, the left pivoting side P1 serves as the pivoting side P in the following description.

The hinge assembly 30 includes a first hinge part 32 and a second hinge part 31 which are fitted with each other, the first hinge part 32 is provided with a driving groove 322, and the second hinge part 31 is provided with a driving shaft 312.

The movable plate 60 is detachably provided in the driving groove 322.

In an opening process of the door 20, the driving shaft 312 moves in the driving groove 322 to drive the door 20 to move from the pivoting side P towards the accommodating chamber S.

Here, in the opening process of the door 20, the door 20 moves towards a side of the accommodating chamber S; that is, at this point, the door 20 rotates relative to the cabinet 10 and is displaced relative to the cabinet 10 in the first direction X, thus greatly reducing a distance by which the door 20 protrudes out of the cabinet 10 towards a side apart from the accommodating chamber S in the rotation process; that is, the displacement of the door 20 in the first direction X counteracts a part of the door 20 protruding out of the cabinet 10 in the second direction Y in the rotation process, thereby preventing the door 20 from interfering with a peripheral cupboard or wall, or the like, in the opening process; the refrigerator is suitable for an embedded cupboard or a scenario with a small space for accommodating the refrigerator 100.

Moreover, when entering the driving groove 322, dust, impurities, or the like, may be brought out by detaching the movable plate 60 from the driving groove 322.

For other descriptions of the movable plate 60, reference may be made to the description of the previously described hinge assembly 30, which is not repeated herein.

Figure 7:
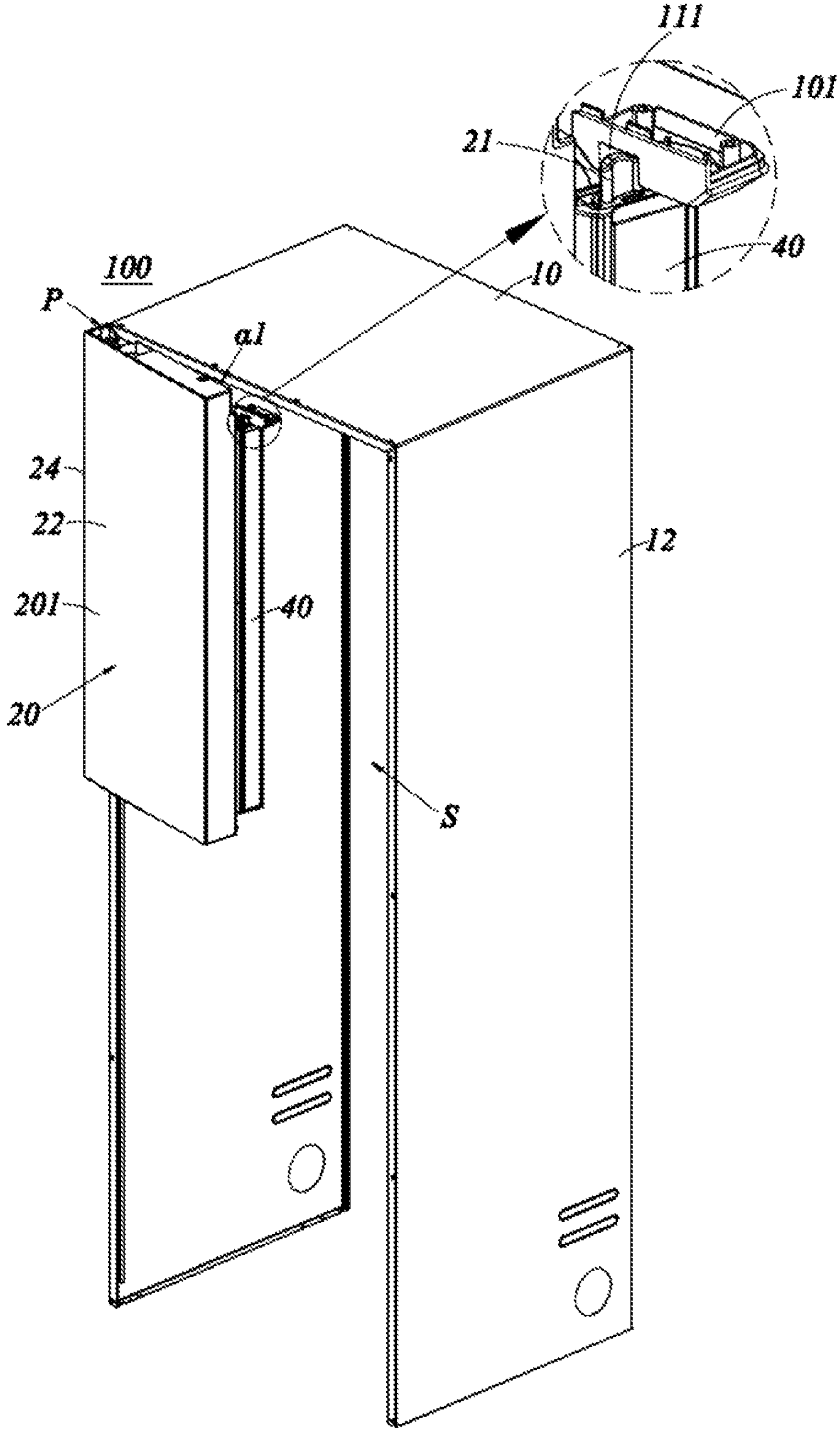
FIG. 7 is a schematic diagram in which a refrigerator is opened to a first opening angle according to an embodiment of the present invention.

In the present embodiment, referring to FIG. 7, when the door 20 is opened to a first opening angle α1 from a closed state, the hinge assembly 30 drives the door 20 to rotate in situ relative to the cabinet 10.

Here, when opened to the first opening angle α1 from the closed state, the door 20 rotates in situ relative to the cabinet 10; that is, the door 20 only rotates without generating displacement in other directions, thus effectively avoiding that the door 20 is unable to be normally opened due to displacement in a certain direction of the door 20; specific reference may be made to descriptions of the following specific examples.

Figure 8:
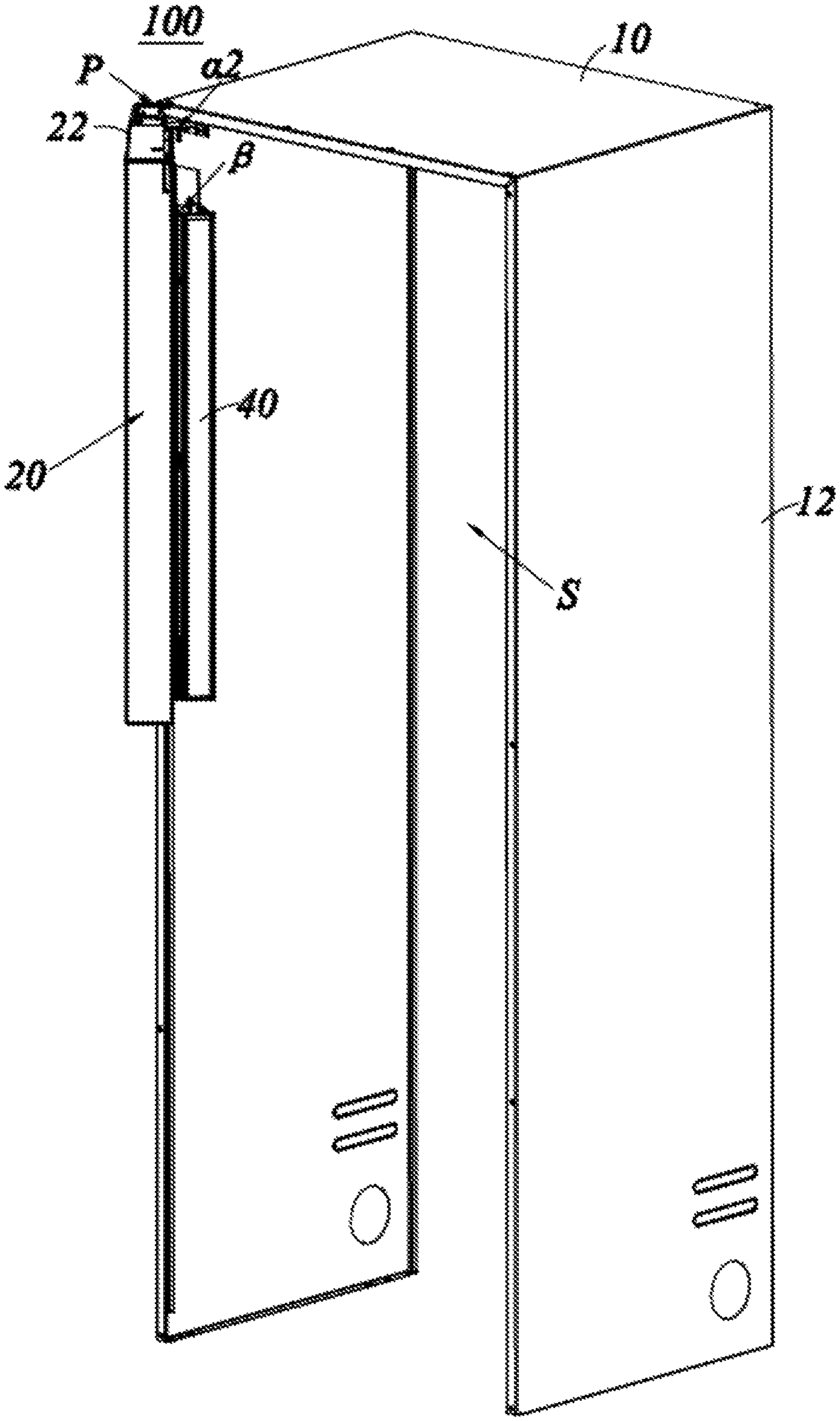
FIG. 8 is a schematic diagram in which a refrigerator is opened to a second opening angle according to an embodiment of the present invention.

Referring to FIG. 8, when the door 20 is continuously opened to a second opening angle α2 from the first opening angle α1, the hinge assembly 30 drives the door 20 to move from the pivoting side P towards the accommodating chamber S.

Here, when the door 20 is continuously opened to the second opening angle α2 from the first opening angle α1, the door 20 moves towards the side of the accommodating chamber S; that is, at this point, the door 20 rotates relative to the cabinet 10 and is displaced relative to the cabinet 10 in the first direction X, thus greatly reducing the distance by which the door 20 protrudes out of the cabinet 10 towards the side apart from the accommodating chamber S in the rotation process; that is, the displacement of the door 20 in the first direction X counteracts the part of the door 20 protruding out of the cabinet 10 in the second direction Y in the rotation process, thereby preventing the door 20 from interfering with the peripheral cupboard or wall, or the like, in the opening process; the refrigerator is suitable for the embedded cupboard or the scenario with a small space for accommodating the refrigerator 100.

Figure 9:
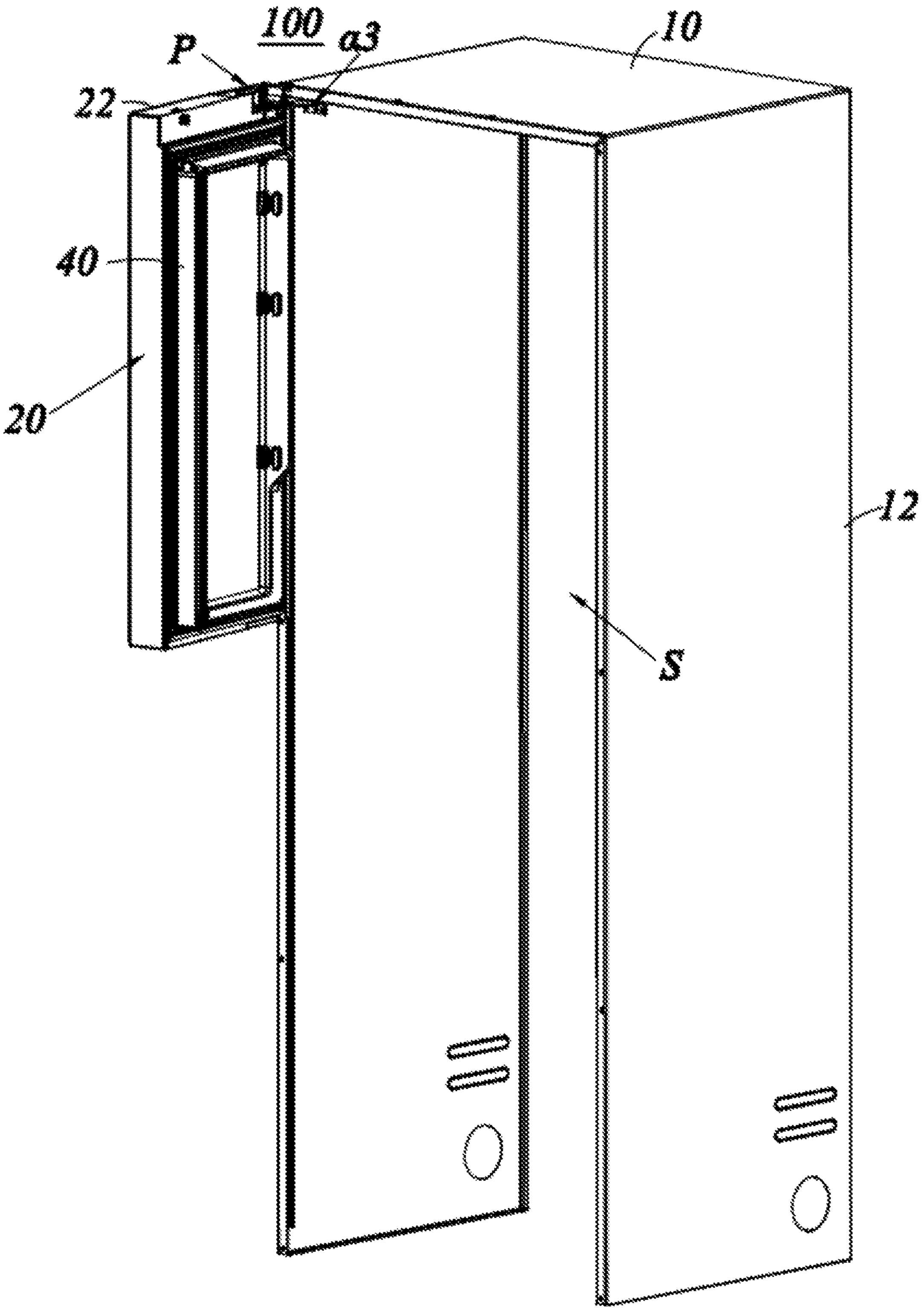
FIG. 9 is a schematic diagram in which a refrigerator is opened to a third opening angle according to an embodiment of the present invention.

Referring to FIG. 9, when the door 20 is continuously opened to a third opening angle α3 from the second opening angle α2, the hinge assembly 30 drives the door 20 to move from the accommodating chamber S towards the pivoting side P.

Here, when continuously opened to the third opening angle α3 from the second opening angle α2, the door 20 moves towards a side of the pivoting side P; that is, at this point, the door 20 rotates relative to the cabinet 10 and is displaced in the second direction Y relative to the cabinet 10, such that the door 20 may be as far away from the cabinet 10 as possible, thus guaranteeing an opening degree of the cabinet 10, and avoiding a problem that drawers, racks, or the like, in the cabinet 10 are unable to be opened due to interference of the door 20.

Figure 10:
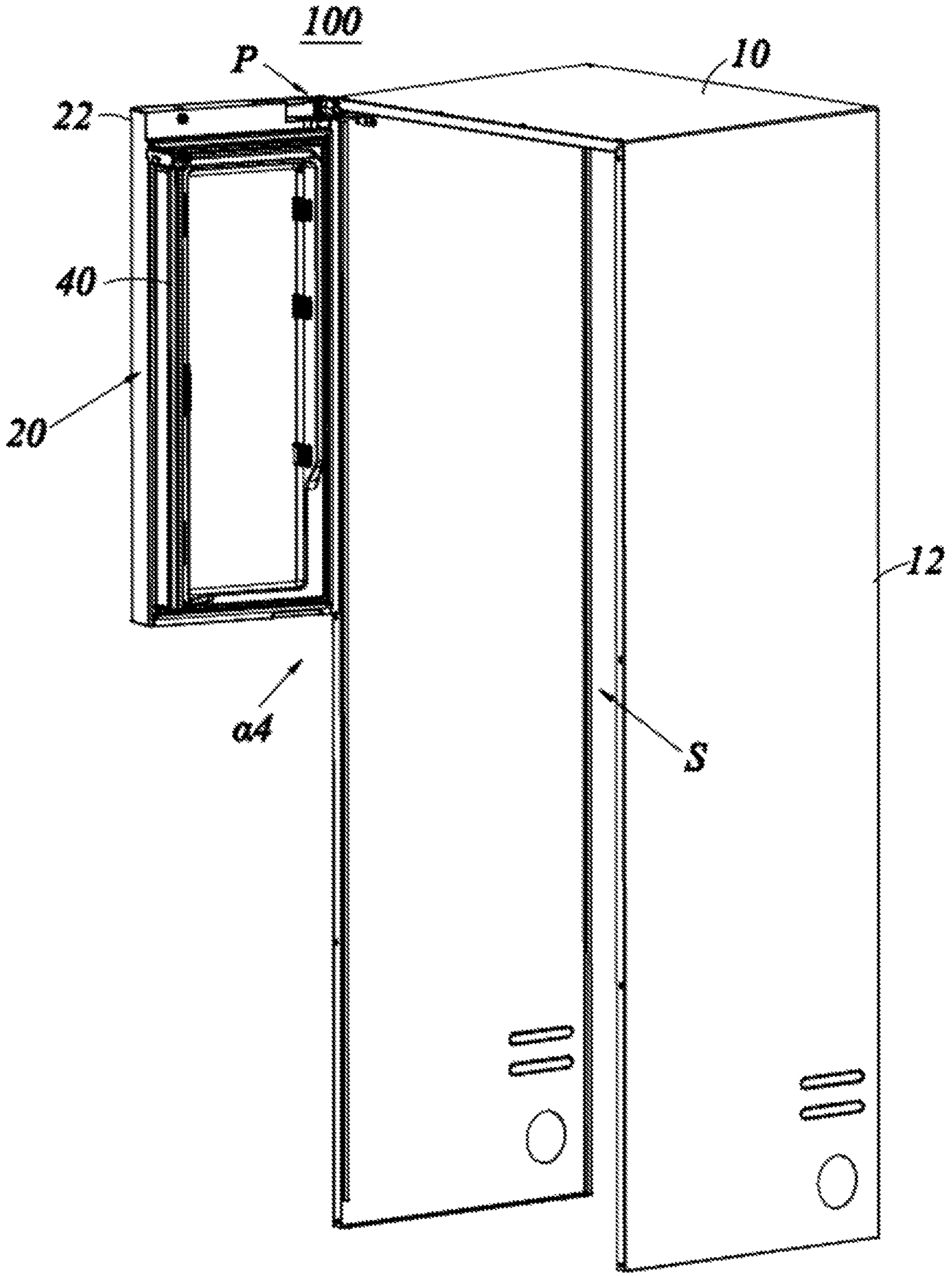
FIG. 10 is a schematic diagram in which a refrigerator is opened to a maximum opening angle according to an embodiment of the present invention.

Referring to FIG. 10, when the door 20 is continuously opened to a maximum opening angle α4 from the third opening angle α3, the hinge assembly 30 drives the door 20 to rotate in situ relative to the cabinet 10.

With continued reference to FIGS. 5 to 10, in a specific example of the present invention, the door 20 is provided with a first fitting portion 21, and the cabinet 10 is provided with a second fitting portion 11.

Figure 6:
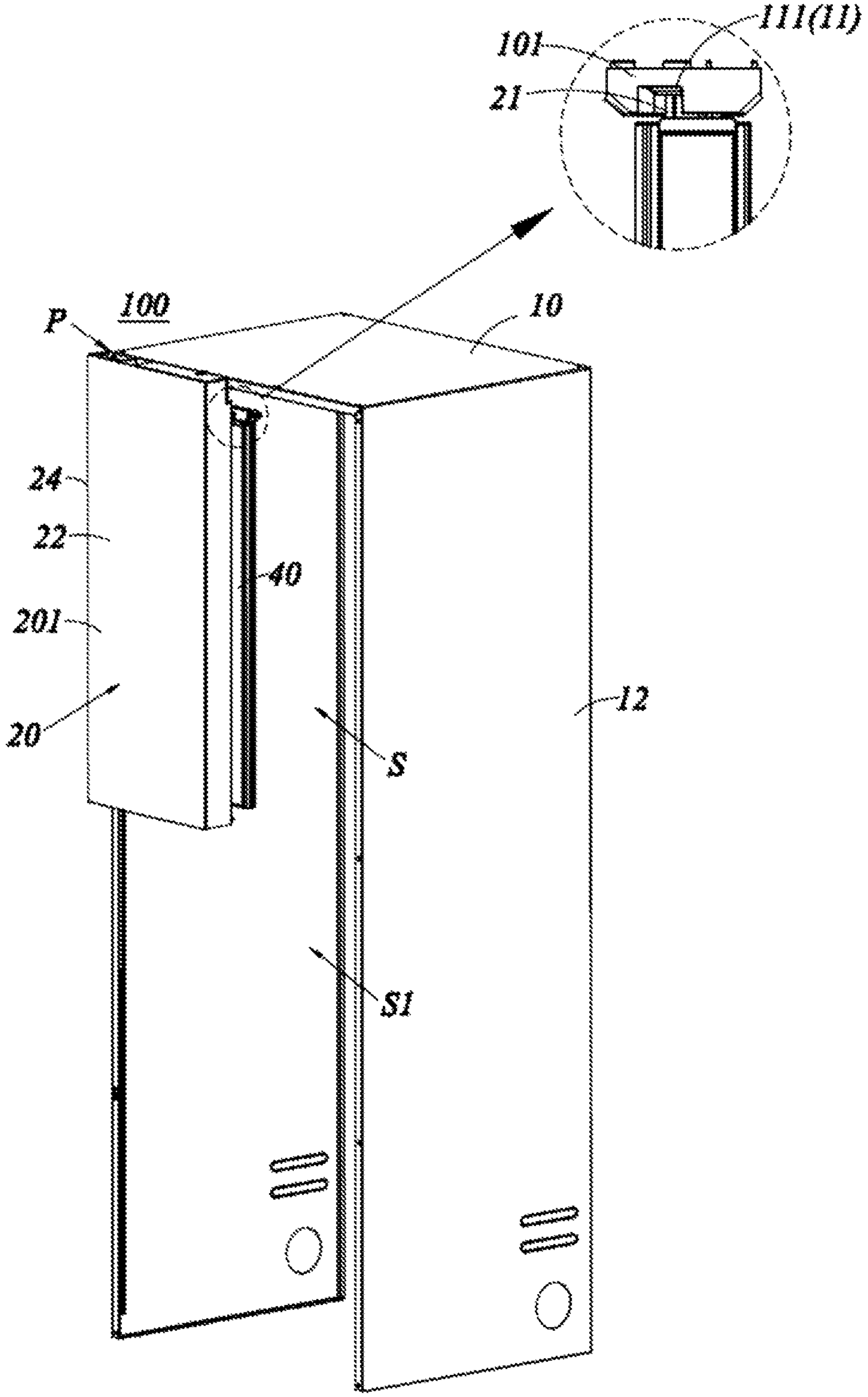
FIG. 6 is a schematic diagram in which a refrigerator is in a closed state according to an embodiment of the present invention.

Referring to FIG. 6, when the door 20 is in the closed state, the first fitting portion 21 and the second fitting portion 11 are engaged with each other.

Here, the first fitting portion 21 and the second fitting portion 11 are engaged with each other to close the door 20 and the cabinet 10, and specific forms of the first fitting portion 21 and the second fitting portion 11 may be determined according to actual situations.

Referring to FIG. 7, when the door 20 is opened to the first opening angle α1 from the closed state, the hinge assembly 30 drives the door 20 to rotate in situ relative to the cabinet 10, so as to drive the first fitting portion 21 to be disengaged from the second fitting portion 11.

Here, when opened to the first opening angle α1 from the closed state, the door 20 rotates in situ relative to the cabinet 10; that is, the door 20 only rotates without generating displacement in other directions, thus effectively avoiding that the first fitting portion 21 is unable to be disengaged from the second fitting portion 11 due to the displacement in a certain direction of the door 20.

It should be noted that the refrigerator 100 in this example may be a single-door refrigerator having the first fitting portion 21 and the second fitting portion 11, or a side-by-side refrigerator, a multi-door refrigerator, or the like, having the first fitting portion 21 and the second fitting portion 11.

Figure 11:
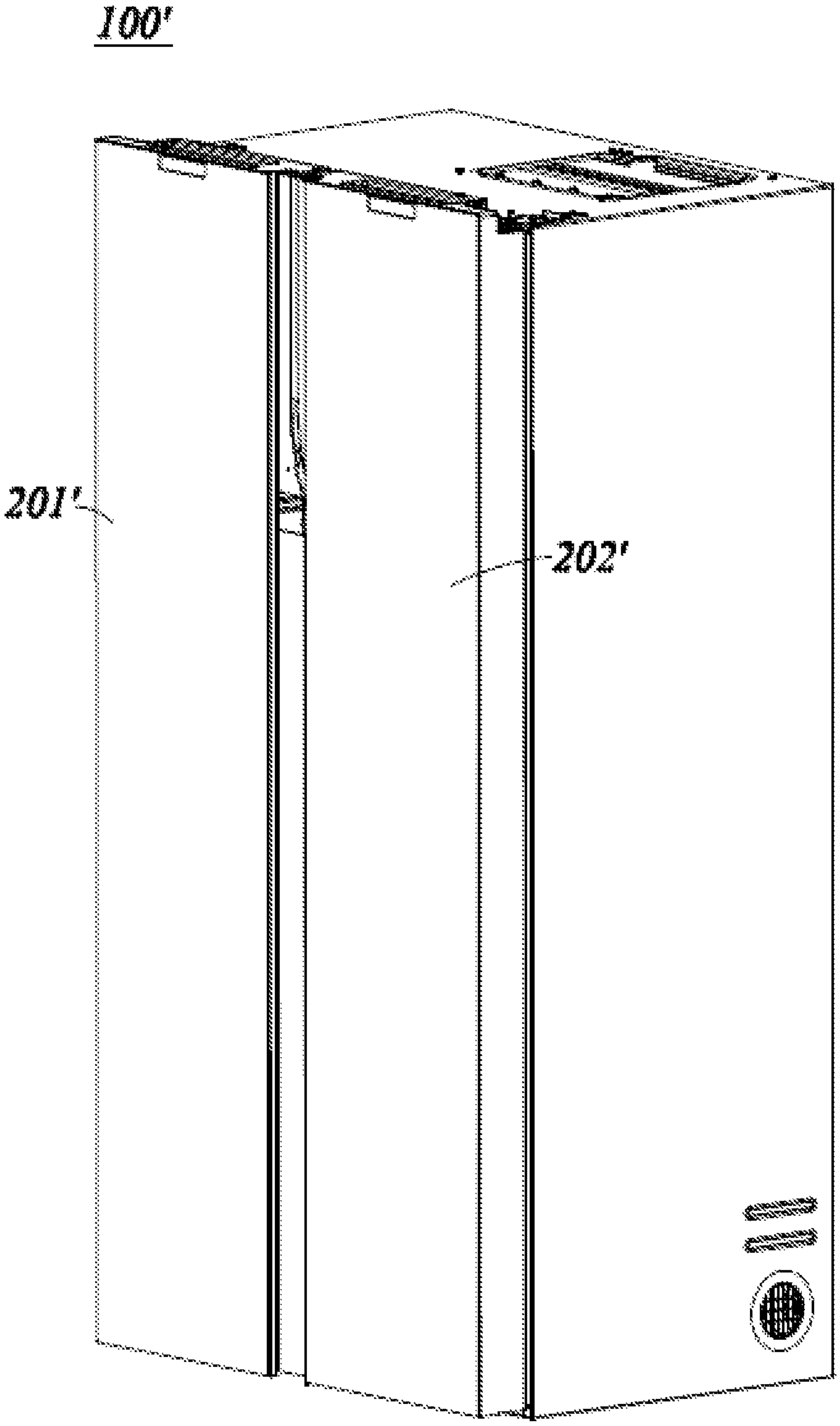
FIG. 11 is an overall schematic diagram of a refrigerator in another specific example of the present invention.
Figure 12:
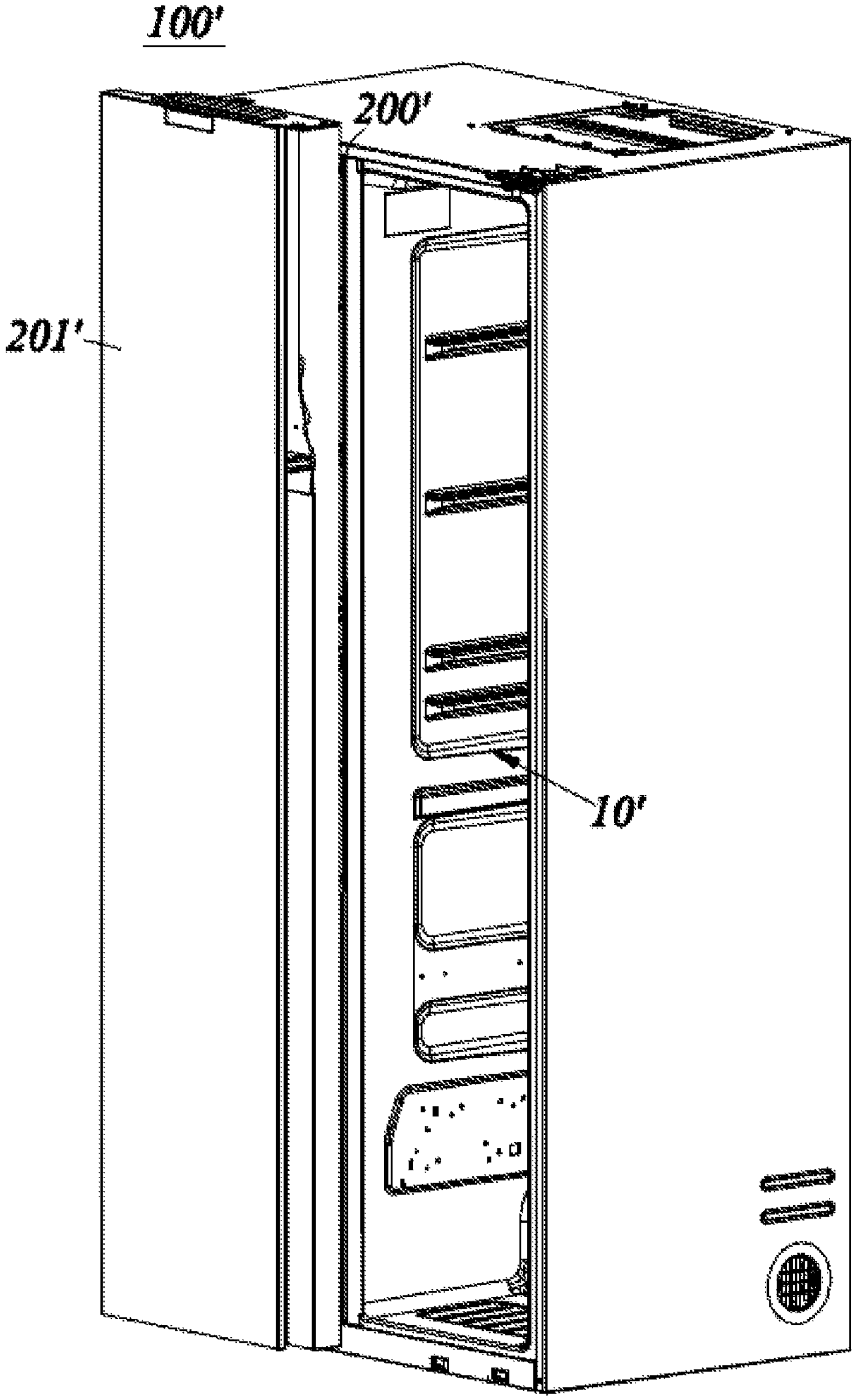
FIG. 12 is a schematic diagram of a refrigerator in another specific example of the present invention with a part omitted.

In other specific examples, the refrigerator 100 may not include the first fitting portion 21 and the second fitting portion 11; with reference to FIGS. 11 and 12, the refrigerator 100 is configured as a side-by-side refrigerator 100', the refrigerator 100' includes two compartments distributed at intervals, and the two compartments are spaced apart from each other by a fixed beam 200'; the refrigerator 100' further includes a first door 201' and a second door 202' corresponding to the two compartments respectively, and the first door 201' and the second door 202' are provided adjacent to each other; when the refrigerator 100' is in a closed state, both the first door 201' and the second door 202' contact the fixed beam 200' to achieve a sealing effect, and when the first door 201' and/or the second door 202' are/is opened from the closed state to the first opening angle α1, the first door 201' and/or the second door 202' rotate(s) in situ relative to the cabinet 10'.

Here, when the first door 201' is displaced horizontally when opened, the first door 201' and the second door 202' are unable to be opened normally due to interference therebetween, but the first door 201' and the second door 202' rotate in situ when the refrigerator 100' in this example is opened, thus effectively avoiding the interference between the adjacent first and second doors 201', 202'.

Certainly, the type of the refrigerator 100 is not limited to the above-mentioned specific examples, and may be determined according to actual situations.

Figure 13:
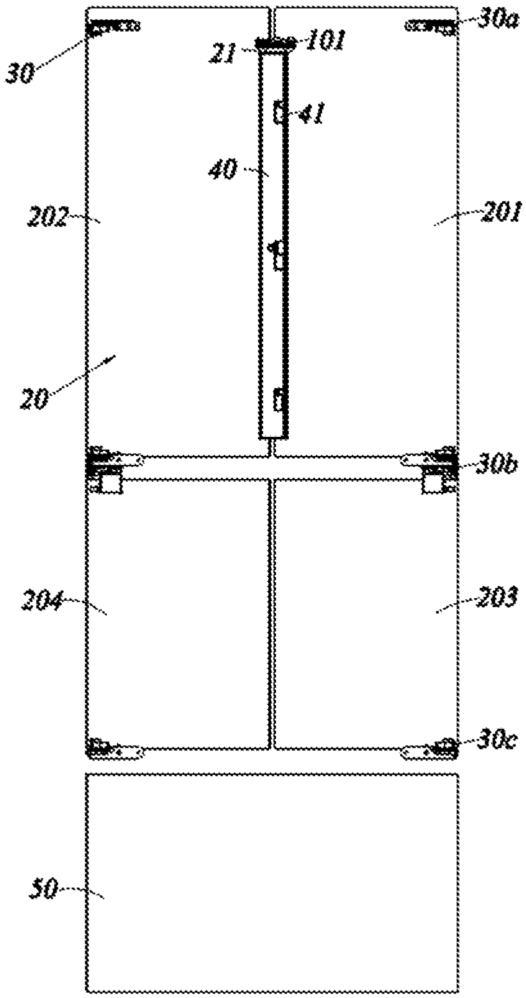
FIG. 13 is a rear view of a refrigerator according to an embodiment of the present invention (with partial elements omitted)
Figure 14:
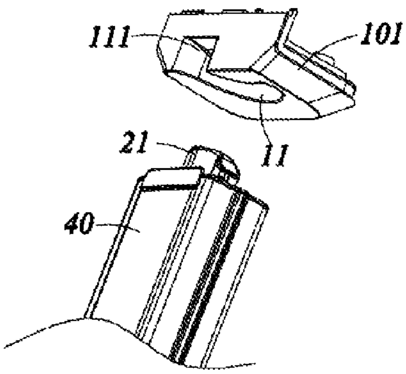
FIG. 14 is an exploded view of a first fitting portion and a second fitting portion according to an embodiment of the present invention.

Referring to FIGS. 13 and 14, the door 20 includes a first door 201 and a second door 202 pivotally connected with the cabinet 10 and arranged side by side in a horizontal direction.

The refrigerator 100 further includes a vertical beam 40 movably connected to a side of the first door 201 close to the second door 202, and the first fitting portion 21 is provided at the vertical beam 40.

Here, the vertical beam 40 is movably connected to a right side of the first door 201, the vertical beam 40 and the first door 201 may be connected by a return spring 41, and the vertical beam 40 rotates relative to the first door 201 around an axis in a vertical direction; in other words, under the action of the return spring 41, the vertical beam 40 may rotate relative to the first door 201 and be kept at a predetermined position.

The first fitting portion 21 is configured as a bump 21 protruding upwards from the vertical beam 40.

The second fitting portion 11 is fixedly provided on the cabinet 10; for example, the second fitting portion 11 is configured as a groove 11 in a base 101, the base 101 is fixedly provided at a top of the accommodating chamber S, a notch 111 is provided in an end of the groove 11, the notch 111 has a forward opening, the bump 21 and the groove 11 are both arc-shaped, and the bump 21 enters or leaves the groove 11 through the notch 111 to achieve mutual limitation and separation of the bump 21 and the groove 11.

Certainly, it may be understood that specific structures of the first and second fitting portions 21, 11 are not limited to the above description; that is, the first fitting portion 21 is not limited to the bump 21 at the vertical beam 40, the second fitting portion 11 is not limited to the groove 11 fitted with the bump 21, and the first and second fitting portions 21, 11 may be configured as structures fitted with each other in other regions of the refrigerator 100.

In the present embodiment, the door 20 further includes a third door 203 and a fourth door 204 pivotally connected to the cabinet 10 and arranged side by side in the horizontal direction, the third door 203 is located below the first door 201, the fourth door 204 is located below the second door 202, and the refrigerator 100 further includes a drawer 50 located below the third door 203 and the fourth door 204.

Here, the accommodating chamber S corresponding to the first door 201 and the second door 202 is configured as a refrigerating chamber; that is, the refrigerating chamber has a side-by-side structure; the third door 203 and the fourth door 204 correspond to two independent variable temperature compartments S1 respectively; the drawer 50 is configured as a freezing drawer.

It should be noted that the refrigerator 100 includes a fixed beam fixed inside the cabinet 10 and configured to separate the two variable temperature compartments S1, and the third door 203 and the fourth door 204 may be fitted with the fixed beam to achieve a sealing effect; that is, at this point, no vertical beam is required to be provided at the third door 203 and the fourth door 204.

It may be understood that the refrigerator 100 according to the present embodiment may have other structures, such as a side-by-side refrigerator including only the first door 201 and the second door 202, or the like.

In the present embodiment, the hinge assemblies 30 located at different regions of the door 20 have different structures; for example, a first hinge assembly 30*a* is located between an upper end of the first door 201 and the cabinet 10, a second hinge assembly 30*b* is located among a lower end of the first door 201, an upper end of the third door 203 and the cabinet 10, and a third hinge assembly 30*c* is located between a lower end of the third door 203 and the cabinet 10; the hinge assemblies 30 are symmetrically arranged left and right; that is, for descriptions of the hinge assemblies 30 at the second door 202, reference may be made to the descriptions of the first hinge assembly 30*a* and the second hinge assembly 30*b* at the first door 201, and for descriptions of the hinge assemblies 30 at the fourth door 204, reference may be made to the descriptions of the second hinge assembly 30*b* and the third hinge assembly 30*c* at the third door 203.

Here, the second hinge assembly 30*b* is located between the first door 201 and the third door 203; that is, the first door 201 and the third door 203 share the second hinge assembly 30*b*, and the second hinge assembly 30*b* may be processed adaptively.

Figure 15:
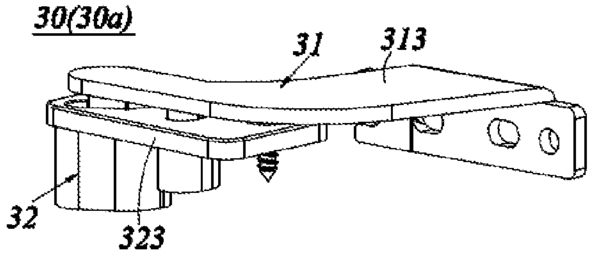
FIG. 15 is a schematic diagram of a first hinge assembly according to an embodiment of the present invention.
Figure 16:
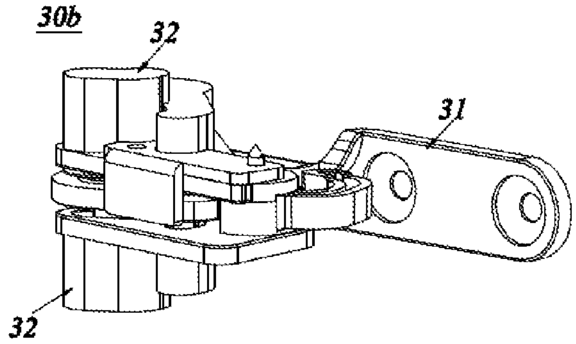
FIG. 16 is a schematic diagram of a second hinge assembly according to an embodiment of the present invention.
Figure 17:
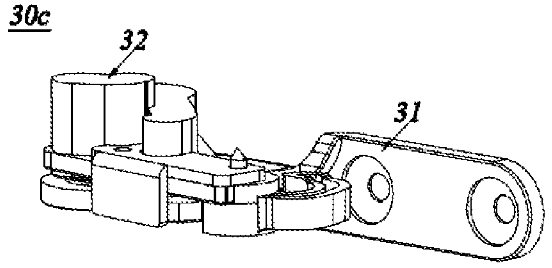
FIG. 17 is a schematic diagram of a third hinge assembly according to an embodiment of the present invention.
Figure 18:
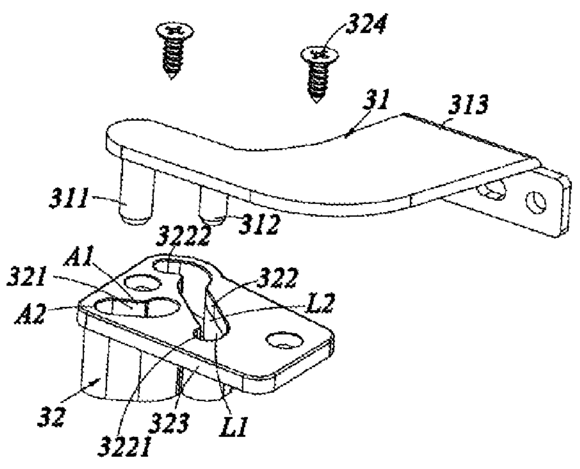
FIG. 18 is an exploded view of a first hinge assembly according to an embodiment of the present invention.

Referring to FIGS. 15 to 17, FIG. 15 is a schematic diagram of the first hinge assembly 30*a*, FIG. 16 is a schematic diagram of the second hinge assembly 30*b*, and FIG. 17 is a schematic diagram of the third hinge assembly 30*c*.

Next, the hinge assembly 30 according to the present embodiment is described by taking the first hinge assembly 30*a* located between the upper end of the first door 201 and the cabinet 10 as an example, and for the descriptions of the other hinge assemblies, reference may be made to the description of the first hinge assembly 30*a*.

Referring to FIGS. 18 to 28, the hinge assembly 30 (or the first hinge assembly 30*a*) further includes a positioning shaft 311 and a positioning groove 321 which are fitted with each other, the positioning shaft 311 is provided on one of the first hinge part 32 and the second hinge part 31, the positioning groove 321 is provided in the other of the first hinge part 32 and the second hinge part 31.

Here, for example, the positioning groove 321 is provided in the first hinge part 32, and the positioning shaft 311 is provided on the second hinge part 31.

Specifically, the first hinge part 32 is located on the door 20, and the second hinge part 31 is located on the cabinet 10.

The first hinge part 32 includes a first hinge part body 323, as well as the positioning groove 321 and the driving groove 322 recessed in the first hinge part body 323, and the first hinge part body 323 is fixed to the door 20 by a screw 324.

The second hinge part 31 includes a second hinge part body 313, as well as the positioning shaft 311 and the driving shaft 312 protruding out of the second hinge part body 313, and the second hinge part body 313 and the cabinet 10 are fixed to each other.

In the present embodiment, the positioning groove 321 includes an initial position A1 and a first stop position A2, the driving groove 322 includes a first end 3221 and a second end 3222 opposite to each other, when the door 20 is in the closed state, the positioning shaft 311 is located at the initial position A1, and the driving shaft 312 is located at the first end 3221, and when the door 20 is opened, the driving shaft 312 moves in the driving groove 322 to drive the positioning shaft 311 to move from the initial position A1 to the first stop position A2.

The cabinet 10 includes an outer side surface 12 adjacent to the hinge assembly 30 and on an extension section of a rotation path of the door 20, the door 20 includes a front wall 22 apart from the accommodating chamber S and a side wall 23 always clamped between the front wall 22 and the accommodating chamber S, and a side edge 24 is provided between the front wall 22 and the side wall 23.

Here, the outer side surface 12 is configured as a left side surface (corresponding to the left pivoting side P1) or a right side surface (corresponding to the right pivoting side P2) of the cabinet 10, different pivoting sides P correspond to different outer side surfaces 12, the front wall 22 is configured as a front surface of the door 20, and the side wall 23 is configured as a side surface of the door 20.

The driving groove 322 includes a first section L1 and a second section L2 connected between the first end 3221 and a second end 3222.

Figure 19:
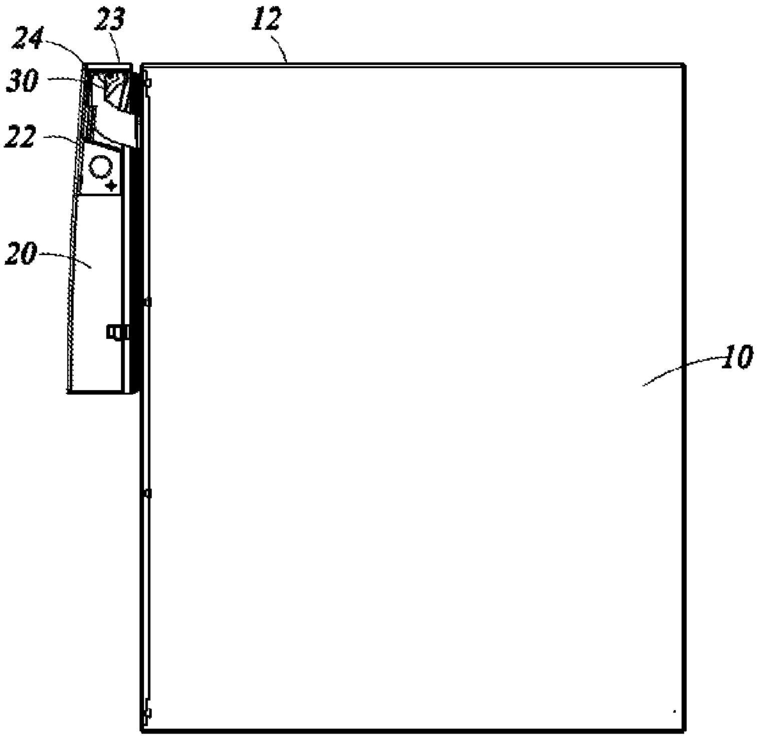
FIG. 19 is a top view in which a refrigerator is in a closed state according to an embodiment of the present invention.
Figure 20:
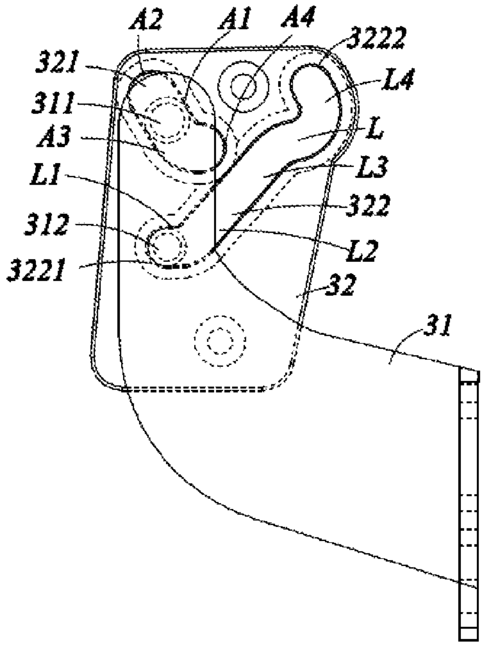
FIG. 20 is a perspective view of a hinge assembly in FIG. 19.

Referring to FIGS. 19 and 20, when the door 20 is in the closed state, the first fitting portion 21 and the second fitting portion 11 are engaged with each other; that is, the bump 21 is limited in the groove 11, the positioning shaft 311 is located at the initial position A1, the driving shaft 312 is located at the first end 3221, and the driving shaft 312 limits the separation of the movable plate 60 from the driving groove 322.

Specifically, the bump 21 is limited in the groove 11, such that the vertical beam 40 extends to the second door 202; that is, at this point, the vertical beam 40 is attached to inner side surfaces of the first door 201 and the second door 202, so as to prevent cold air in the accommodating chamber S from leaking to the outside of the refrigerator 100.

In addition, the outer side surface 12 and the side wall 23 are located on a same plane, which may guarantee appearance smoothness, improve attractiveness, and facilitate a mounting process of the door 20, but the present invention is not limited thereto.

Figure 21:
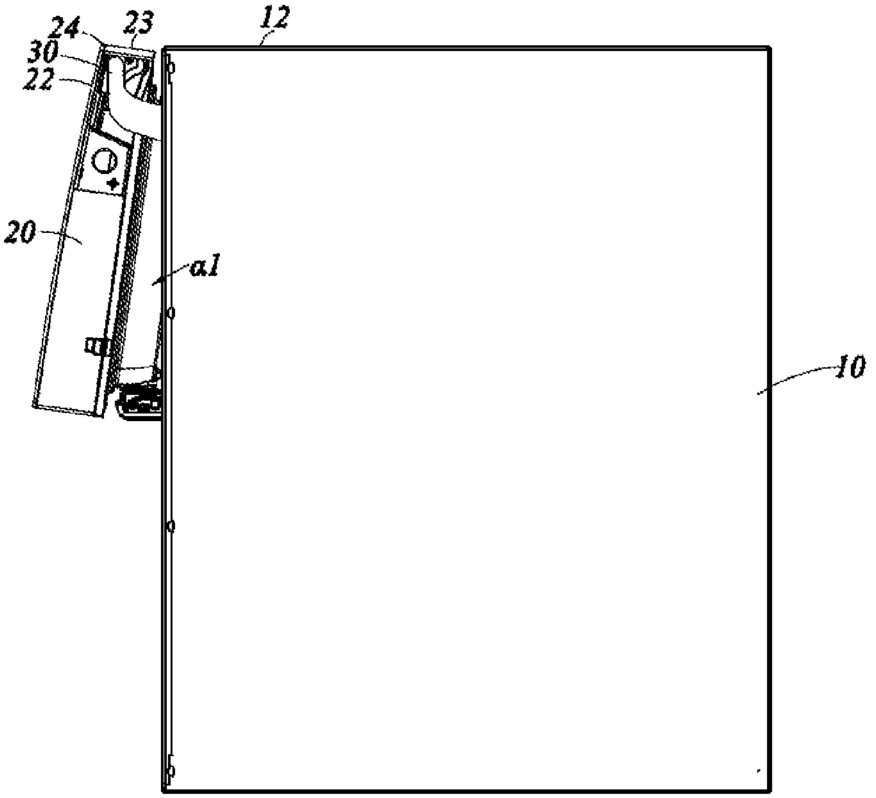
FIG. 21 is a top view in which a refrigerator is opened to a first opening angle according to an embodiment of the present invention.
Figure 22:
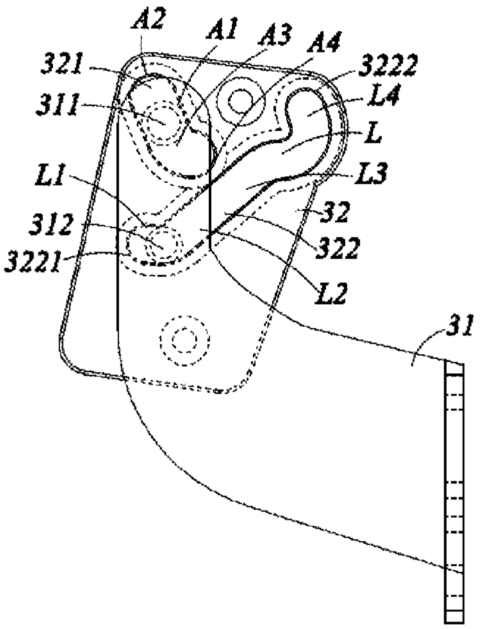
FIG. 22 is a perspective view of a hinge assembly in FIG. 21.

Referring to FIGS. 21 and 22, when the door 20 is opened from the closed state to the first opening angle α1, the positioning shaft 311 is kept at the initial position A1, and the driving shaft 312 moves in the first section L1 around the positioning shaft 311, so as to drive the first fitting portion 21 to be disengaged from the second fitting portion 11, and the driving shaft 312 limits the separation of the movable plate 60 from the driving groove 322.

Specifically, the bump 21 is gradually disengaged from the groove 11 through the notch 111, and at the same time, the vertical beam 40 rotates towards a side close to the accommodating chamber S, such that the first door 201 and the vertical beam 40 have a first folding angle β therebetween.

Here, when the bump 21 is completely disengaged from the groove 11, the first folding angle β is preferably kept less than 90 degrees, thus preventing the vertical beam 40 from affecting opening and closing operations of the second door 202.

It should be noted that, since an arc fit exists between the bump 21 and the groove 11, when the door 20 is in the closed state, the bump 21 and the groove 11 are limited in the first direction X or the second direction Y; when the door 20 is displaced in the first direction X or the second direction Y when opened to the first opening angle α1, the bump 21 and the groove 11 may interfere with each other and be jammed, such that the bump 21 is unable to be disengaged from the groove 11, and therefore, the door 20 is unable to be opened.

In the present embodiment, the door 20 rotates in situ relative to the cabinet 10 when the door 20 is opened to the first opening angle α1, thus ensuring that the door 20 is not displaced in the first direction X or the second direction Y in this process, and then ensuring that the bump 21 may be smoothly disengaged from the groove 11.

Here, the first opening angle is not greater than 10°; that is, the bump 21 may not be restricted by the groove 11 in the process of opening the door 20 to about 10°, and at this point, the bump 21 may be completely disengaged from the groove 11, or the bump 21 may not interfere with the groove 11 even when displaced in the first direction X or the second direction Y.

In addition, when the outer side surface 12 and the side wall 23 are located on the same plane when the door 20 is in the closed state, the side edge 24 protrudes out of the outer side surface 12 in the second direction Y in the rotation process (a protruding distance does not exceed 3 mm in general).

Figure 23:
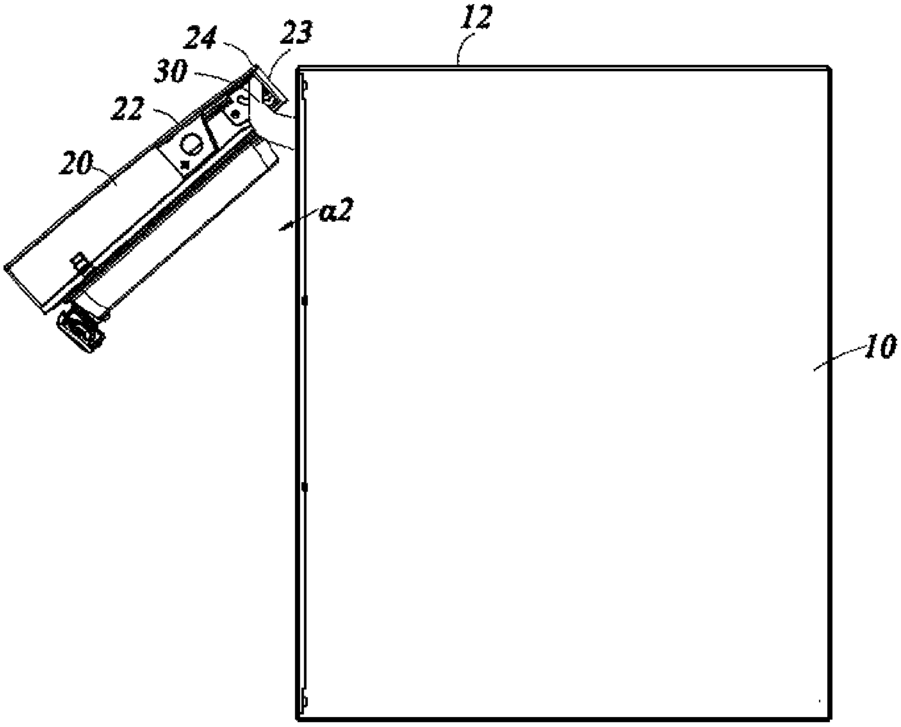
FIG. 23 is a top view in which a refrigerator is opened to a second opening angle according to an embodiment of the present invention.
Figure 24:
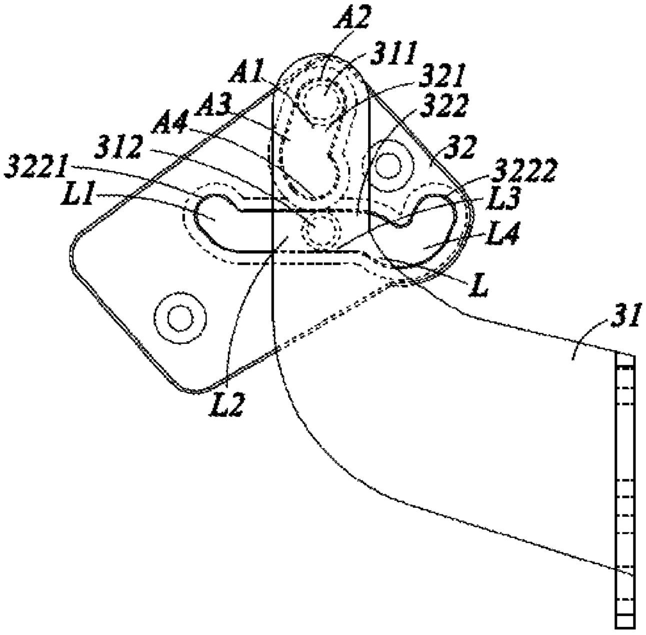
FIG. 24 is a perspective view of a hinge assembly in FIG. 23.

With reference to FIGS. 23 and 24, when the door 20 is continuously opened from the first opening angle α1 to the second opening angle α2, the driving shaft 312 moves in the second section L2 to drive the positioning shaft 311 to move from the initial position A1 to the first stop position A2, and simultaneously, the driving shaft 312 moves from the first position 3221 to the second position 3222, and the driving shaft 312 limits the separation of the movable plate 60 from the driving groove 322.

Specifically, the vertical beam 40 and the first door 201 are kept relatively static; that is, at this point, the first folding angle β is kept between the vertical beam 40 and the first door 201; at this point, when the first door 201 is closed again, the bump 21 is inserted into the groove 11 through the notch 111 of the groove 11 and moves along an extending track of the groove 11, so as to drive the vertical beam 40 to gradually rotate to a fully unfolded state; that is, at this point, the vertical beam 40 is simultaneously attached to the inner side surfaces of the first door 201 and the second door 202.

In addition, the side edge 24 moves to a side of the outer side surface 12 close to the accommodating chamber S; that is, at this point, the hinge assembly 30 drives the side edge 24 to move towards the side close to the accommodating chamber S, such that interference between the side edge 24 and the peripheral cupboard or wall, or the like, due to the side edge 12 protruding out of the outer side surface 12 may be avoided in the opening process of the door 20.

Here, in order to guarantee the opening degree of the cabinet 10 as much as possible and avoid the problem that the drawers, the racks, or the like, in the cabinet 10 are unable to be opened due to interference of the door 20, the side edge 24 moves towards the side close to the accommodating chamber S into the plane of the outer side surface 12, and then, the hinge assembly 30 drives the side edge 24 to move in the plane and gradually approach the accommodating chamber S.

That is, at this point, on the basis of ensuring that the side edge 24 does not protrude out of the corresponding outer side surface 12, the side edge 24 is made to be as close as possible to the outer side surface 12, thus avoiding the interference between the door 20 and the peripheral cupboard or wall, or the like, in the opening process, and guaranteeing the opening degree of the cabinet 10 as much as possible.

In another embodiment, the positioning groove 321 further includes a second stop position A3 located on a side of the initial position A1 apart from the first stop position A2, the driving groove 322 further includes a third section L3 and a fourth section L4 located between the second section L2 and the second end 3222, the movable plate 60 covers the first section L1, the second section L2, the third section L3 and a part of the fourth section L4 of the driving groove 322, and the movable plate 60 only exposes a region close to the second end 3222.

Figure 25:
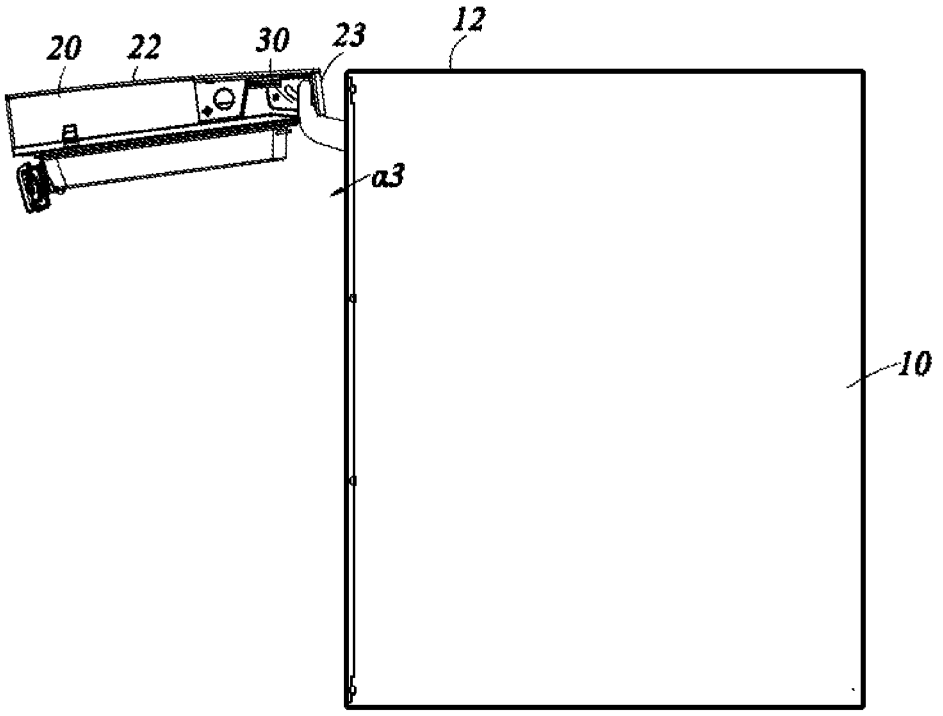
FIG. 25 is a top view in which a refrigerator is opened to a third opening angle according to an embodiment of the present invention.
Figure 26:
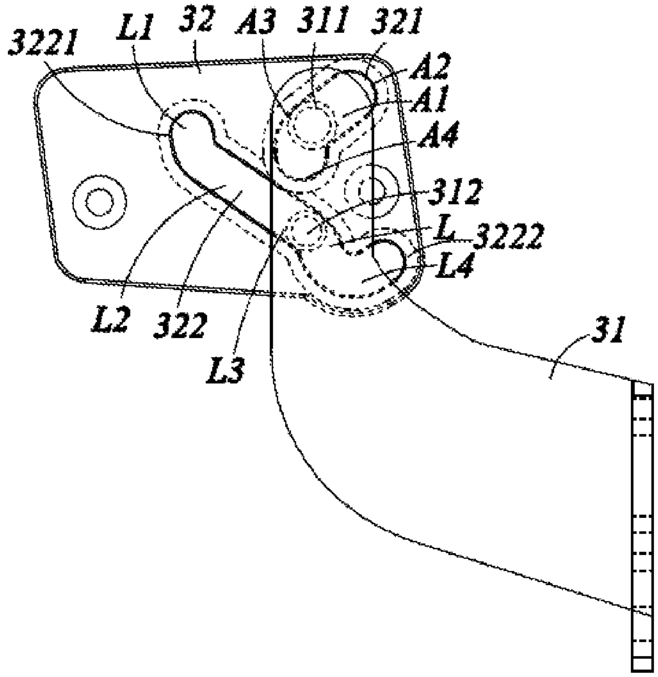
FIG. 26 is a perspective view of a hinge assembly in FIG. 25.

With reference to FIGS. 25 and 26, when the door 20 is continuously opened from the second opening angle α2 to the third opening angle α3, the driving shaft 312 moves in the third section L3 to drive the positioning shaft 311 to move from the first stop position A2 to the second stop position A3, and at this point, the door 20 moves from the accommodating chamber S towards the pivoting side P, so as to prevent the door 20 from obstructing an opening operation of the drawers, the racks, or the like, in the cabinet 10, and the driving shaft 312 limits the separation of the movable plate 60 from the driving groove 322.

Specifically, the vertical beam 40 and the first door 201 are kept relatively static.

In addition, the side edge 24 moves in the plane of the outer side surface 12 and gradually approaches the accommodating chamber S.

It may be understood that, when the door 20 is continuously opened from the second opening angle α2 to the third opening angle α3, when the door 20 rotates in situ relative to the cabinet 10, the side edge 24 gradually moves towards the side close to the accommodating chamber S, and meanwhile, the door 20 gradually moves close to the accommodating chamber S, and the door 20 may obstruct the opening operation of the drawers, the racks, or the like, in the cabinet 10; that is, the opening degree of the cabinet 10 may be reduced.

The hinge assembly 30 according to the present embodiment drives the side edge 24 to move in the plane of the outer side surface 12; that is, the door 20 may be as far away from the cabinet 10 as possible, thus guaranteeing the opening degree of the cabinet 10, avoiding the problem that the drawers, the racks, or the like, in the cabinet 10 are unable to be opened due to the interference of the door 20, and also preventing the side edge 24 from protruding out of the outer side surface 12 in a direction apart from the accommodating chamber S.

Figure 27:
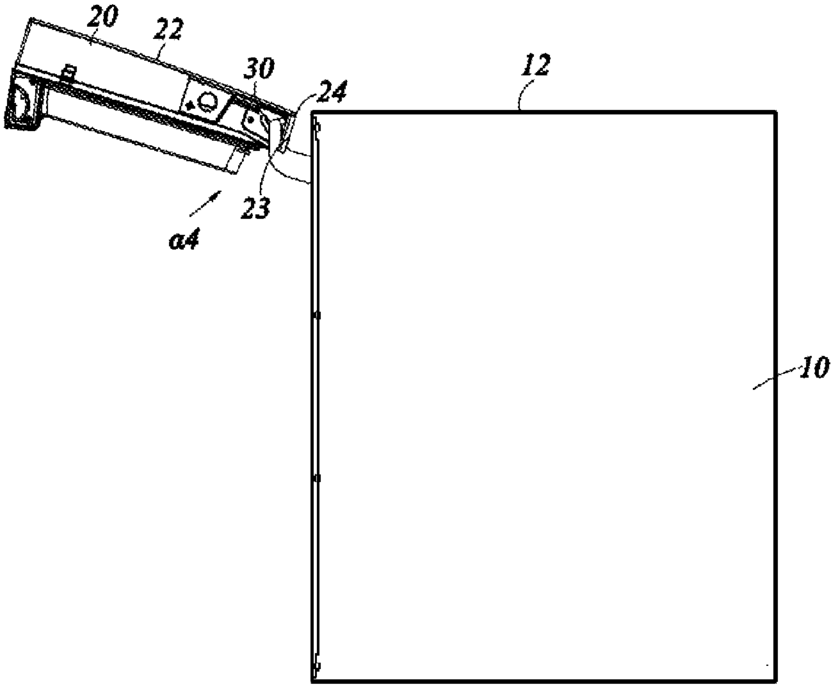
FIG. 27 is a top view in which a refrigerator is opened to a maximum opening angle according to an embodiment of the present invention.
Figure 28:
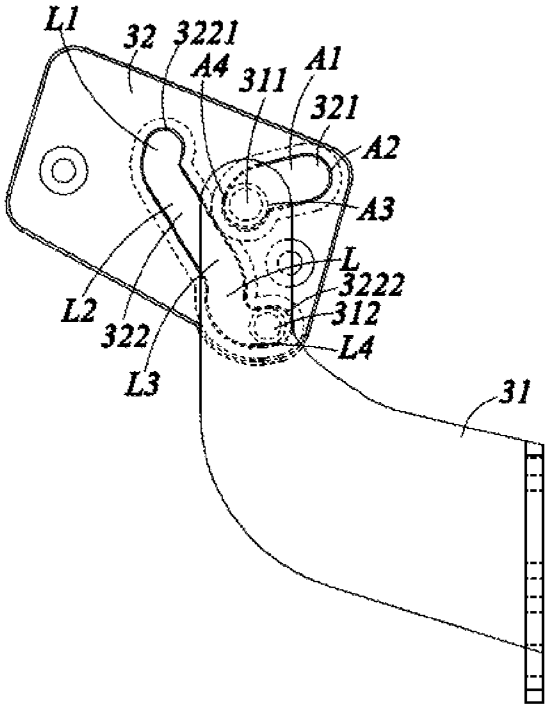
FIG. 28 is a perspective view of a hinge assembly in FIG. 27.

With reference to FIGS. 27 and 28, when the door 20 is continuously opened from the third opening angle α3 to the maximum opening angle α4, the positioning shaft 311 is kept at the second stop position A3, the driving shaft 312 moves in the fourth section L4 around the positioning shaft 311, and when the driving shaft 312 moves to the second end 3222, the driving shaft 312 is separated from the movable plate 60, and at this point, the movable plate 60 may be taken out of the driving groove 322.

Here, the side edge 24 is always located on the side of the outer side surface 12 close to the accommodating chamber S.

In addition, the second opening angle is not greater than 90°, the third opening angle is 90°, and the maximum opening angle is greater than 90°; that is, in the process of opening the door 20 to 90°, the door 20 is first displaced in the first direction X to prevent the door 20 from interfering with the peripheral cupboard or wall, or the like, in the opening process, and then, the door 20 is displaced in the second direction Y to prevent the door 20 from obstructing the opening operation of the drawers, the racks, or the like, in the cabinet 10, and finally, after opened to 90°, the door 20 rotates in situ relative to the cabinet 10 to be further opened.

It may be understood that, when the door 20 is opened from the closed state to the first opening angle α1, since the door 20 rotates in situ relative to the cabinet 10, the door 20 slightly protrudes out of the cabinet 10 towards the side (left side) apart from the accommodating chamber S; when the door 20 is continuously opened from the first opening angle α1 to the second opening angle α2, the displacement of the door 20 in the first direction X may counteract the entire part of the door 20 protruding out of the cabinet 10 in the second direction Y during the whole rotation process; then, when the door 20 is continuously opened from the second opening angle α2 to the third opening angle α3, the displacement of the door 20 in the second direction Y may make the door 20 not protrude out of the cabinet 10 and guarantee the opening degree of the cabinet 10 as much as possible.

In other embodiments, the positioning groove 321 further includes a pivoting position A4 located on a side of the second stop position A3 apart from the initial position A1, the driving groove 322 further includes a transition section L located between the third section L3 and the fourth section L4, and a connecting line of the second stop position A3 and the pivoting position A4 is parallel to the transition section L.

The first stop position A2, the initial position A1, and the second stop position A3 are located on a straight line, while the pivoting position A4 is not located on the straight line, and an included angle is formed between the pivoting position A4 and the straight line.

When the door 20 is continuously opened from the third opening angle α3 to the maximum opening angle α4, the driving shaft 312 moves in the transition section L to drive the positioning shaft 311 to move from the second stop position A3 to the pivoting position A4, and then, the positioning shaft 311 is kept at the pivoting position A4, and the driving shaft 312 moves in the fourth section L4 around the positioning shaft 311.

Here, when the door 20 rotates in situ relative to the cabinet 10 to be further opened, when the positioning shaft 311 is kept at the second stop position A3, since a parallel part exists between the fourth section L and a part between the first stop position A2 and the second stop position A3, the door 20 may slide or sway.

In the present embodiment, when the driving shaft 312 moves in the fourth section L4, the positioning shaft 311 is kept at the pivoting position A4 without swaying, thus solving the problem that the door 20 laterally slides or sways.

In the present embodiment, a first connecting line of the center of the positioning shaft 311 at the initial position A1, the center of the positioning shaft 311 at the first stop position A2, and the center of the positioning shaft 311 at the second stop position A3 passes through the side edge 24 of the door 20.

A distance between the center of the positioning shaft 311 at the initial position A1 and the side edge 24 is greater than a distance between the center of the positioning shaft 311 at the first stop position A2 and the side edge 24, and less than a distance between the center of the positioning shaft 311 at the second stop position A3 and the side edge 24.

A distance between the center of the positioning shaft 311 at the initial position A1 and the front wall 22 is greater than a distance between the center of the positioning shaft 311 at the first stop position A2 and the front wall 22, and less than a distance between the center of the positioning shaft 311 at the second stop position A3 and the front wall 22.

A distance between the center of the positioning shaft 311 at the initial position A1 and the side wall 23 is greater than a distance between the center of the positioning shaft 311 at the first stop position A2 and the side wall 23, and less than a distance between the center of the positioning shaft 311 at the second stop position A3 and the side wall 23.

A first distance exists between the center of the positioning shaft 311 and the side edge 24, a second distance exists between the center of the positioning shaft 311 and the front wall 22, a third distance exists between the center of the positioning shaft 311 and the side wall 23, and the first distance, the second distance and the third distance are changed in the opening process of the door 20.

When the door 20 is continuously opened from the first opening angle α1 to the second opening angle α2, the first distance, the second distance and the third distance all decrease, and when the door 20 is continuously opened from the second opening angle α2 to the third opening angle α3, the first distance, the second distance and the third distance all increase, and when the door 20 continuously opened from the third opening angle α3 to the maximum opening angle α4, the first distance, the second distance and the third distance are all kept unchanged.

In summary, in the present invention, the first fitting portion 21 may be guaranteed to be smoothly disengaged from the second fitting portion 11 by the fitting structure of the positioning shaft 311, the positioning groove 321, the driving shaft 312 and the driving groove 322; the inclusion of the vertical beam 40 by the refrigerator 100 may ensure that the bump 21 on the vertical beam 40 is smoothly disengaged from the groove 11 on the cabinet 10 without interference with each other at the initial opening stage of the door 20, and then, the door 20 moves from the pivoting side P towards the accommodating chamber S during the continuous opening process of the door 20, so as to prevent the door 20 from interfering with the peripheral cupboard or wall, or the like, in the opening process, and the refrigerator is suitable for the embedded cupboard or the scenario with a small space for accommodating the refrigerator 100; in addition, when the opening angle of the door 20 is greater, the door 20 moves from the accommodating chamber S towards the pivoting side P to prevent the door 20 from obstructing the opening operation of the drawers, the racks, or the like, in the cabinet 10, and when entering the driving groove 322, dust, impurities, or the like, may be brought out by detaching the movable plate 60 from the driving groove 322.

The above embodiments are merely used for explaining the technical solution of the present invention and not limiting. Although the present invention has been described in detail with reference to preferable embodiments, for example, when technologies in different embodiments may be used in conjunction with each other to achieve corresponding effects at the same time, the solutions thereof also fall within a protection scope of the present invention. A person skilled in the art shall understand that various modifications or equivalent substitutions may be made to the technical solution of the present invention without departing from the spirit and scope of the technical solution of the present invention.

What is claimed is:

1. A hinge assembly with a movable plate, comprising a first hinge part, a second hinge part, and the movable plate, wherein the first hinge part, the second hinge part, and the movable plate are fitted with one another, the first hinge part is provided with a driving groove, the second hinge part is provided with a driving shaft fitted with the driving groove, and the movable plate is detachably provided in the driving groove;

wherein the driving groove comprises a bottom wall and a side wall provided around the bottom wall, and the movable plate is provided adjacent to the bottom wall;

wherein the bottom wall comprises a first region and a second region, the first region is overlapped with the movable plate, and the second region is separated from the movable plate; when moving in the first region, the driving shaft restricts separation of the movable plate from the driving groove, and when moving to the second region, the driving shaft is separated from the movable plate.

2. The hinge assembly with a movable plate according to claim 1, wherein the movable plate comprises a first side portion and a second side portion connected with each other, the first side portion is movably connected with the side wall, and the second side portion is provided around the first region.

3. The hinge assembly with a movable plate according to claim 2, wherein the first side portion has a first clamping portion, the side wall has a second clamping portion, and the first clamping portion and the second clamping portion are fitted with each other.

4. The hinge assembly with a movable plate according to claim 3, wherein the movable plate comprises a movable plate body, the first clamping portions are configured as a plurality of protrusions protruding from the movable plate body, the protrusion is parallel to the movable plate body, the second clamping portions are configured as a plurality of recesses located at the side wall near the bottom wall, and the plurality of protrusions and the plurality of recesses are fitted with each other.

5. The hinge assembly with a movable plate according to claim 1, wherein the movable plate is provided with a poking hole, and the poking hole drives the movable plate to be separated from the driving groove when a force is applied to the poking hole.

6. The hinge assembly with a movable plate according to claim 1, wherein the movable plate comprises a movable plate body and a plurality of protruding portions protruding from the movable plate body, the protruding portion is perpendicular to the movable plate body, the movable plate body and the bottom wall are fitted with each other, and the protruding portion and the side wall are fitted with each other.

7. The hinge assembly with a movable plate according to claim 6, wherein the side wall is provided with a plurality of groove portions fitted with the plurality of protruding portions, an extending direction of the groove portion is parallel to an opening direction of the bottom wall towards the driving groove, a protruding point is provided in the groove portion, and the protruding portion is provided with a hole fitted with the protruding point.

8. The hinge assembly with a movable plate according to claim 7, wherein a slope is provided on a side of the protruding portion apart from the movable plate body, and when the protruding portion is limited in the groove portion, a gap is formed between the slope and the groove portion.

9. A refrigerator, comprising the hinge assembly with a movable plate according to claim 1.

10. The refrigerator according to claim 9, comprising a cabinet, a door for opening and closing the cabinet, and the hinge assembly for connecting the cabinet and the door, wherein the cabinet comprises an accommodating chamber and a pivoting side connected with the hinge assembly; when the door is opened, the driving shaft moves in the driving groove to drive the door to move from the pivoting side to the accommodating chamber.

11. The refrigerator according to claim 10, wherein the hinge assembly further comprises a positioning shaft and a positioning groove fitted with each other, the positioning shaft is provided on one of the first hinge part and the second hinge part, and the positioning groove is provided in the other of the first hinge part and the second hinge part.

12. The refrigerator according to claim 11, wherein the positioning groove is provided in the first hinge part, and the positioning shaft is provided on the second hinge part.

13. The refrigerator according to claim 12, wherein the positioning groove comprises an initial position and a first stop position, and the driving groove comprises a first end and a second end opposite to each other; when the door is in a closed state, the positioning shaft is located at the initial position, and the driving shaft is located at the first end, and when the door is opened, the driving shaft moves in the driving groove to drive the positioning shaft to move from the initial position to the first stop position.

14. The refrigerator according to claim 13, wherein the driving groove comprises a first section and a second section connected between the first end and the second end; when the door is opened from the closed state to a first opening angle, the positioning shaft is kept at the initial position, and the driving shaft moves in the first section around the positioning shaft, and when the door is continuously opened from the first opening angle to a second opening angle, the driving shaft moves in the second section to drive the positioning shaft to move from the initial position to the first stop position.

15. The refrigerator according to claim 14, wherein the door is provided with a first fitting portion, the cabinet is provided with a second fitting portion, the first fitting portion and the second fitting portion are engaged with each other when the door is in the closed state, and when the door is opened from the closed state to the first opening angle, the driving shaft moves in the first section around the positioning shaft to drive the first fitting portion to be disengaged from the second fitting portion.

16. The refrigerator according to claim 15, wherein the positioning groove further comprises a second stop position located on a side of the initial position apart from the first stop position, and the driving groove further comprises a third section and a fourth section located between the second section and the second end; when the door is continuously opened from the second opening angle to a third opening angle, the driving shaft moves in the third section to drive the positioning shaft to move from the first stop position to the second stop position, and when the door is continuously opened from the third opening angle to a maximum opening angle, the positioning shaft is kept at the second stop position, the driving shaft moves in the fourth section around the positioning shaft, and when moving to the second end, the driving shaft is separated from the movable plate.

17. The refrigerator according to claim 16, wherein the movable plate covers the first section, the second section, the third section and a part of the fourth section of the driving groove.

18. The refrigerator according to claim 16, wherein the door comprises a first door and a second door, the first door and the second door are pivotally connected with the cabinet and arranged side by side in a horizontal direction, the refrigerator further comprises a vertical beam movably connected to a side of the first door close to the second door, the first fitting portion is provided at the vertical beam, and when the first door and the second door are in the closed state, the vertical beam extends to the second door; when the first door is opened from the closed state to the first opening angle, the vertical beam rotates towards a side close to the accommodating chamber, such that a first folding angle is formed between the first door and the vertical beam, and when the first door is continuously opened from the first opening angle to the second opening angle, the vertical beam and the first door are kept relatively static.

* * * * *